US010130880B2

(12) United States Patent
Oshima et al.

(10) Patent No.: US 10,130,880 B2
(45) Date of Patent: Nov. 20, 2018

(54) INFORMATION PROCESSING SYSTEM AND INFORMATION PROCESSING DEVICE

(71) Applicant: Sony Interactive Entertainment Inc., Tokyo (JP)

(72) Inventors: Takenori Oshima, Tokyo (JP); Masanori Nomura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 205 days.

(21) Appl. No.: 15/031,432

(22) PCT Filed: May 23, 2014

(86) PCT No.: PCT/JP2014/002726
§ 371 (c)(1),
(2) Date: Apr. 22, 2016

(87) PCT Pub. No.: WO2015/063966
PCT Pub. Date: May 7, 2015

(65) Prior Publication Data
US 2016/0256774 A1 Sep. 8, 2016

(30) Foreign Application Priority Data
Oct. 30, 2013 (JP) .................................. 2013-225913

(51) Int. Cl.
*A63F 13/35* (2014.01)
*A63F 13/40* (2014.01)
(Continued)

(52) U.S. Cl.
CPC ............ *A63F 13/35* (2014.09); *A63F 13/213* (2014.09); *A63F 13/214* (2014.09); *A63F 13/22* (2014.09);
(Continued)

(58) Field of Classification Search
CPC .......... A63F 13/20; A63F 13/22; A63F 13/30; A63F 13/323; A63F 13/35; A63F 13/40; A63F 13/843
(Continued)

(56) References Cited

U.S. PATENT DOCUMENTS 8,386,817 B2    2/2013  Yamanaka
8,886,398 B2 *  11/2014 Kato .................. G01C 21/3664
                                                        701/2
(Continued)

FOREIGN PATENT DOCUMENTS

CN    102968549 A    3/2013
CN    103252087 A    8/2013
(Continued)

OTHER PUBLICATIONS

International Search Report for corresponding application PCT/JP2014/002726, 3 pages, dated Aug. 12, 2014.
(Continued)

*Primary Examiner* — Michael Cuff
(74) *Attorney, Agent, or Firm* — Matthew B. Dernier, Esq.

(57) ABSTRACT

Provided is an information processing device capable of accepting operation information from a game controller. An acceptance section accepts operation information from a terminal device different from the game controller. An application execution section executes an application in accordance with operation information accepted by the acceptance section. A delivery processing section transmits application image data to the terminal device. An auxiliary storage device holds input assignment information of the terminal device. The delivery processing section transmits, to the terminal device, input assignment information of the application under execution held by a storage section.

7 Claims, 14 Drawing Sheets

(51) Int. Cl.
    *A63F 13/843*     (2014.01)
    *A63F 13/22*     (2014.01)
    *A63F 13/323*     (2014.01)
    *A63F 13/213*     (2014.01)
    *A63F 13/214*     (2014.01)

(52) U.S. Cl.
    CPC ............ *A63F 13/323* (2014.09); *A63F 13/40* (2014.09); *A63F 13/843* (2014.09)

(58) Field of Classification Search
    USPC .......................................................... 463/31
    See application file for complete search history.

(56) References Cited

U.S. PATENT DOCUMENTS

| | | | |
|---|---|---|---|
| 9,288,665 | B2 | 3/2016 | Kato |
| 2002/0107060 | A1 | 8/2002 | Ohnuma |
| 2003/0157983 | A1 | 8/2003 | Kobayashi |
| 2008/0288878 | A1 | 11/2008 | Hayashi |
| 2010/0095144 | A1 | 4/2010 | Yamanaka |
| 2010/0304860 | A1 | 12/2010 | Gault |
| 2011/0319170 | A1* | 12/2011 | Shimura ............... H04W 4/203 463/42 |
| 2012/0077586 | A1* | 3/2012 | Pishevar ................. A63F 13/06 463/31 |
| 2012/0309534 | A1* | 12/2012 | Markovic ............... A63F 13/20 463/37 |
| 2013/0154958 | A1 | 6/2013 | Calvin |
| 2013/0217498 | A1 | 8/2013 | Wang |
| 2013/0231187 | A1 | 9/2013 | Pu |
| 2014/0179421 | A1* | 6/2014 | Quinn .................... A63F 13/00 463/31 |
| 2014/0179436 | A1* | 6/2014 | Karamfilov ............ A63F 13/12 463/32 |
| 2014/0349753 | A1 | 11/2014 | Imai |
| 2015/0024731 | A1* | 1/2015 | Kato ................. G01C 21/3664 455/418 |

FOREIGN PATENT DOCUMENTS

| | | |
|---|---|---|
| CN | 103294179 A | 9/2013 |
| JP | 2010092923 A | 4/2010 |
| JP | 2010097293 A | 4/2010 |
| WO | 2012036279 A1 | 3/2012 |
| WO | 2013111249 A1 | 8/2013 |

OTHER PUBLICATIONS

European Search Report for corresponding application 14858003.8, 9 pages, dated Jun. 6, 2017.
XP055111653: http:/ /de.selfhtm l.org :80/htm 1/g rafiken/verweis sensitive. htm archived at www.archive.org in 2007, 4 pages. (for relevancy see "European Search Report for corresponding application 14858003.8, 9 pages, dated Jun. 6, 2017" cited above.
International Preliminary Report Patentability for corresponding application PCT/JP2014/002726, 16 pages, dated May 3, 2016.
The First Office Action for corresponding CN Patent Application No. 201480059406.5, 30 pages, dated Aug. 22, 2018.

* cited by examiner

FIG. 2
(a)
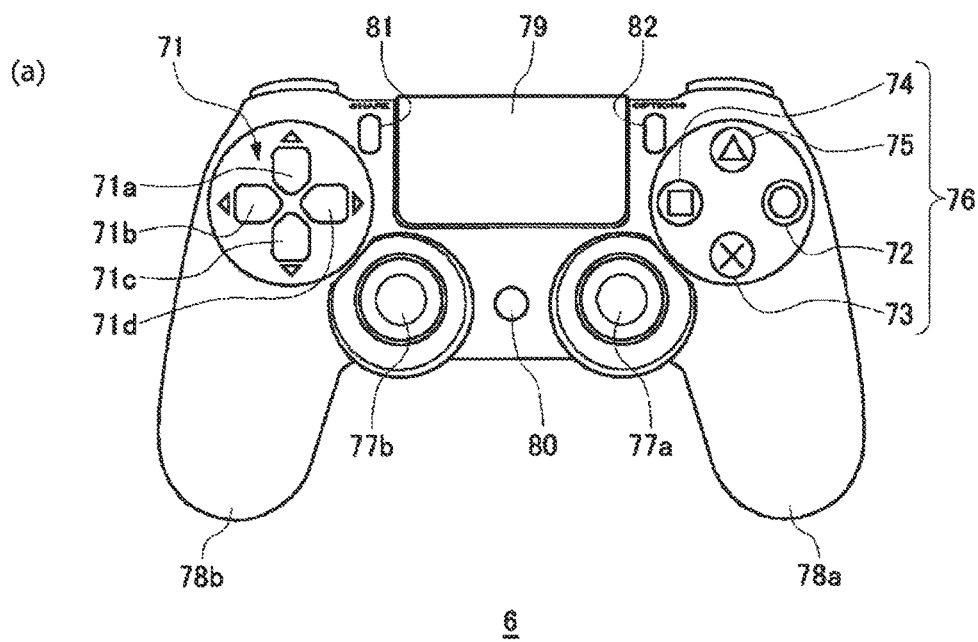
(b)
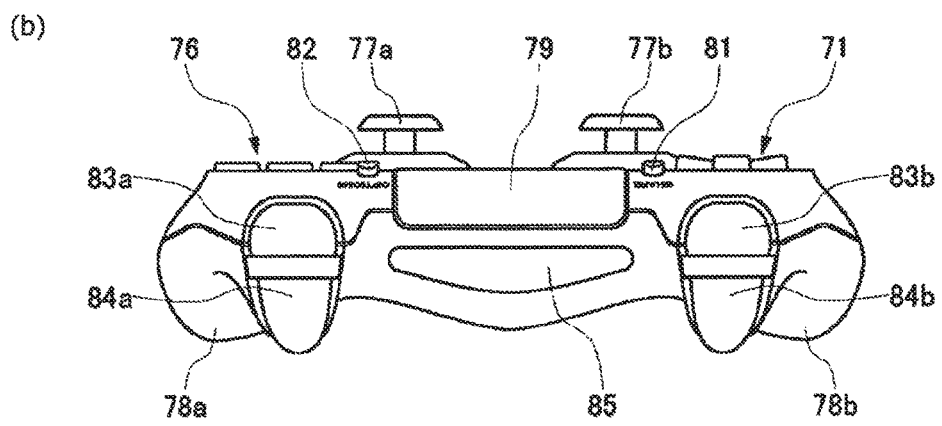

FIG. 4
(a)
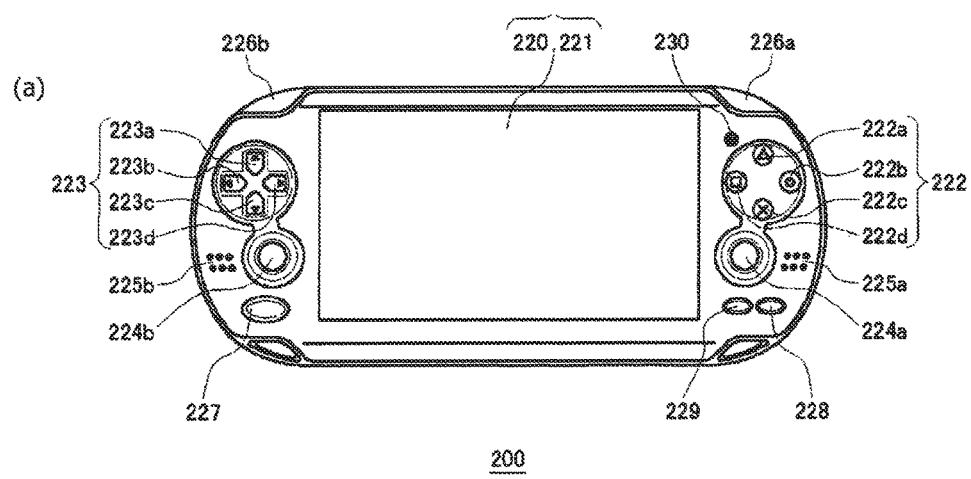
(b)
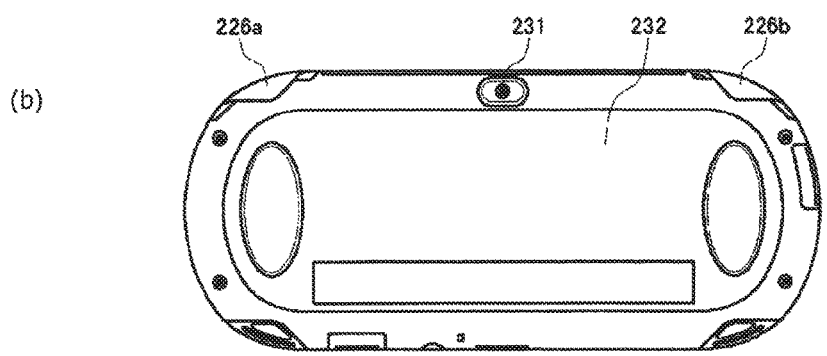

FIG. 9

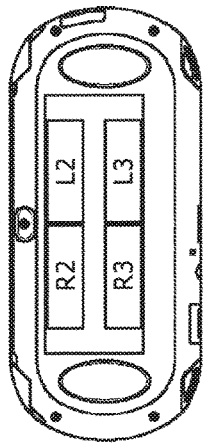

INPUT ASSIGNMENT CORRELATION 340

| GAME CONTROLLER | PORTABLE TERMINAL DEVICE |
|---|---|
| DIRECTIONAL BUTTONS | DIRECTIONAL BUTTONS |
| △○×□ BUTTONS | △○×□ BUTTONS |
| L1 BUTTON, R1 BUTTON | L BUTTON, R BUTTON |
| L2 BUTTON, R2 BUTTON | REAR FACE TOUCH PAD |
| LEFT AND RIGHT ANALOG STICKS | LEFT AND RIGHT ANALOG STICKS |
| L3 AND R3 BUTTONS (ANALOG STICK PUSH-DOWN BUTTONS) | REAR FACE TOUCH PAD |
| SHARE BUTTON | SELECT BUTTON |
| OPTIONS BUTTON | START BUTTON |
| HOME BUTTON | (IN TOOLBAR) |
| TOUCH PAD | FRONT FACE TOUCH PAD |

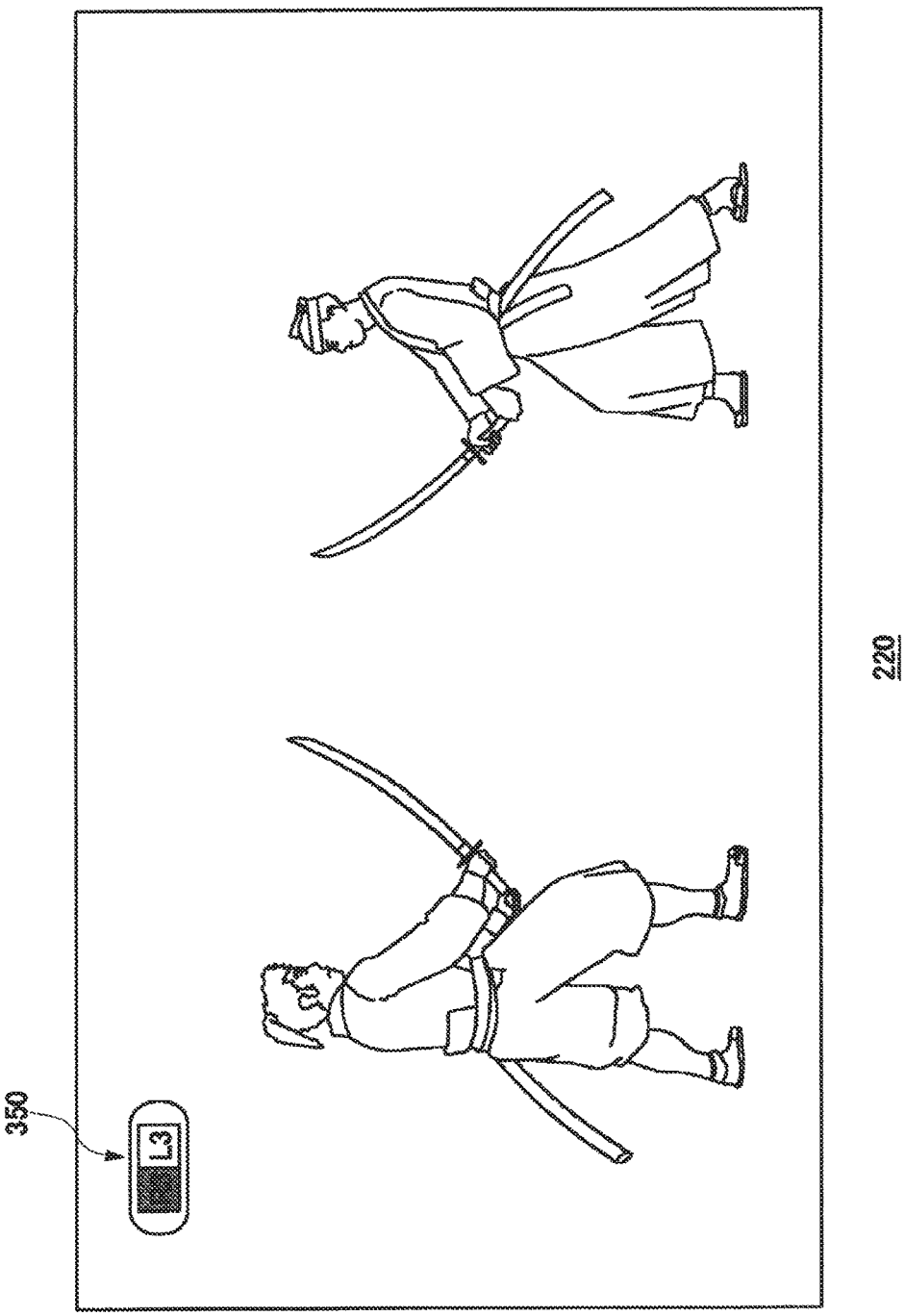

INFORMATION PROCESSING SYSTEM AND INFORMATION PROCESSING DEVICE

TECHNICAL FIELD

The present invention relates to a technology for operating an information processing device using a terminal device.

BACKGROUND ART

PTL 1 discloses an entertainment system using a portable terminal device as an operation terminal operated by a user rather than using a controller that exchanges operation information with an entertainment device through communication. In PTL1, operating the entertainment device (console) through wireless LAN (Local Area Network) communication using a portable terminal device is referred to as "Remote Play." During Remote Play, the console transmits, to the portable terminal device, the same video signal as supplied to a monitor device. The main CPU of the portable terminal device shows, on a display panel, an image based on the video signal received from the console. This ensures that, during Remote Play, the same image as shown on the monitor appears on the display panel of the portable terminal device, and that the user can make an operational input to the console by operating the action keys of the portable terminal device.

CITATION LIST

Patent Literature

[PTL 1] Japanese Patent Laid-open No. 2010-92923

SUMMARY

Technical Problem

In the technology referred to as "Remote Play" which is disclosed in PTL 1, the user makes an operational input to the console using a portable terminal device rather than the controller. Normally, however, the controller and the portable terminal device have different types and numbers of controls. As a result, it is necessary to assign various buttons of the controller to the input sections of the portable terminal device.

In light of the foregoing, it is an object of the present invention to provide a technology for assigning functions of input sections such as various buttons of a controller to those of a portable terminal device in Remote Play.

Solution to Problem

In order to solve the problem, an information processing device of a mode of the present invention can accept operation information from a controller. The information processing device includes an acceptance section, an execution section, a delivery processing section, and a storage section. The acceptance section accepts operation information from a terminal device different from the controller. The execution section executes an application in accordance with operation information accepted by the acceptance section. The delivery processing section transmits application image data to the terminal device. The storage section holds input assignment information of the terminal device. The delivery processing section transmits, to the terminal device, input assignment information of the application under execution held by the storage section.

Another mode of the present invention is an information processing system. The information processing system includes an information processing device and a terminal device. The information processing device can accept operation information from a controller. The terminal device is different from the controller. The terminal device includes a transmission section, a reception section, and a reproduction section. The transmission section transmits operation information. The reception section receives application image data. The reproduction section reproduces received application image data, thus showing the data on a display device. The information processing device includes an acceptance section, an execution section, a delivery processing section, and a storage section. The acceptance section accepts operation information from a terminal device. The execution section executes an application in accordance with operation information accepted by the acceptance section. The delivery processing section transmits application image data to the terminal device. The storage section holds input assignment information of the terminal device. The delivery processing section transmits, to the terminal device, input assignment information of the application under execution held by the storage section.

Still another mode of the present invention is an information processing device capable of accepting operation information. The information processing device includes an input acceptance section, a display section, an image data generation section, and an image data acquisition section. The input acceptance section accepts given operation information. The display section shows first and second input sections when given operation information is accepted by the input acceptance section. The first input section shows a screen for the information processing device. The second input section shows a screen for an information processing device different from the information processing device. The image data generation section generates an image for the information processing device when the first input section is selected. The image data acquisition section acquires image data generated by the information processing device different from the information processing device when the second input section is selected.

It should be noted that any combinations of the above components and any conversions of expressions of the present invention between "method," "device," "system," "recording media," "computer program," and so on are also effective as modes of the present invention.

BRIEF DESCRIPTION OF DRAWINGS

FIG. 2 (*a*) is a diagram illustrating the top face of a game controller, and (*b*) is a diagram illustrating the far side face thereof.

FIG. 4 (*a*) is a diagram illustrating the front face of a portable terminal device, and (*b*) is a diagram illustrating the rear face thereof.

FIG. 9 is a diagram illustrating an input assignment correspondence table.

FIG. 14 is a diagram illustrating an example of a game screen.

DESCRIPTION OF EMBODIMENT

Figure 1:
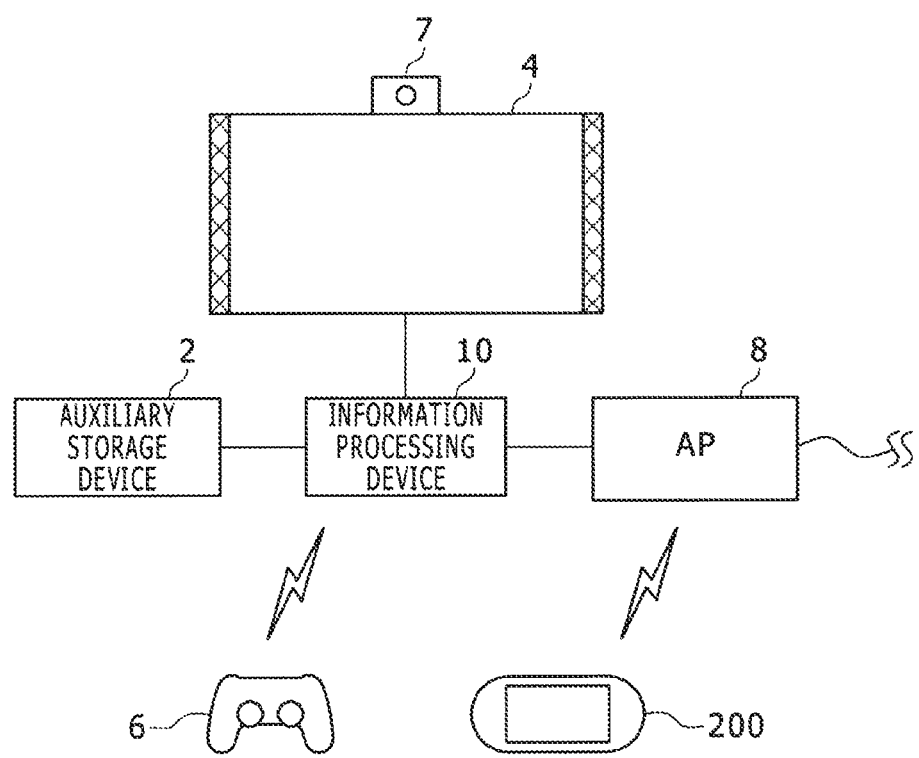
FIG. 1 is a diagram illustrating an information processing system according to an embodiment of the present invention.

FIG. 1 illustrates an information processing system 1 according to an embodiment of the present invention. The information processing system 1 includes an information processing device 10, an auxiliary storage device 2, an output device 4, a game controller 6, a camera 7, and an access point (hereinafter referred to as an "AP") 8. The AP 8 has wireless access point and router functions. The information processing device 10 is a game console which wirelessly connects to the game controller 6 operated by the user. The game controller 6 supplies operation information representing user's button operation to the information processing device 10. When the information processing device 10 accepts operation information from the game controller 6, the information processing device 10 reflects the information in the processing of system and application software, outputting processing results from the output device 4.

The auxiliary storage device 2 is a large-capacity storage device such as HDD (harddisk drive) or flash memory and may be an external storage device that connects to the information processing device 10 by USB (Universal Serial Bus) or the like. Alternatively, the auxiliary storage device 2 may be a built-in storage device. The output device 4 may be a television set having a display adapted to output images and a speaker adapted to produce sounds. Alternatively, the output device 4 may be a computer display. The output device 4 may be connected to the information processing device 10 by a cable. Alternatively, the output device 4 may be wirelessly connected to the information processing device 10. The camera 7, an imaging device, is provided close to the output device 4 to capture an image of the space around the output device 4.

A portable terminal device 200 is an information processing device and may be, for example, a portable game console. The portable terminal device 200 integrally includes a display device. The display device includes, for example, a liquid crystal panel or an organic or inorganic EL panel. When the user loads a cartridge-type game disc into the portable terminal device 200, the portable terminal device 200 executes the game program, showing, at a display position, a game screen that represents game program execution results. It should be noted that the portable terminal device 200 may execute a game program downloaded from an external server.

According to the information processing system 1 of the present embodiment, the information processing system 1 allows for the user to operate the information processing device 10 using the portable terminal device 200 having a wireless function rather than the game controller 6. The mode in which the user plays a game by operating the information processing device 10 using the portable terminal device 200 will be hereinafter referred to as "Remote Play." It should be noted that Remote Play refers to a mode in which the user operates the information processing device 10 using the portable terminal device 200 rather than the game controller 6. Therefore, Remote Play in progress includes not only when the user plays a game using the portable terminal device 200 but also when the user operates the menu screen using the portable terminal device 200.

In Remote Play, the portable terminal device 200 supplies, to the information processing device 10, operation information representing the operation of the input section by the user via the AP 8. As will be described later, the input sections of the portable terminal device 200 include not only a variety of buttons but also a touch pad. However, operation of the input section may be hereinafter simply referred to as button operation. When the information processing device 10 accepts operation information from the portable terminal device 200, the information processing device 10 reflects the information in the processing of the system and application software, causing the output device 4 to show a system screen such as menu screen or a game screen. At this time, the information processing device 10 transmits, to the portable terminal device 200, the system or game screen data to be shown by the output device 4. This allows the portable terminal device 200 to show the system or game screen on the display device in synchronism with the output device 4. Therefore, when a game is executed in Remote Play, the same game video as shown on the output device 4 of the information processing device 10 appears on the display device of the portable terminal device 200. This allows the user to make an operational input to the information processing device 10 by operating the control buttons of the portable terminal device 200 while at the same time watching the game screen of the display device of the portable terminal device 200. It should be noted that although supplying a game video signal to the output device 4 in Remote Play, the information processing device 10 does not need to show game video.

The user can play a game executed by the information processing device 10 using the portable terminal device 200 even when he or she is remotely located from the information processing device 10. For example, the portable terminal device 200 transmits user's operation information to the information processing device 10 via the Internet and receives game image data from the information processing device 10 via the Internet. This makes it possible for the user to enjoy the game executed by the information processing device 10 despite being remotely located. It should be noted that because the user views the screen shown on the display device of the portable terminal device 200 in Remote Play, the information processing device 10 need not necessarily output a game image from the output device 4. However, if one user engages in Remote Play using the portable terminal device 200, and another user in game play using the game controller 6, showing the same game screen on the output device 4 of the information processing device 10 and the display device of the portable terminal device 200 allows the plurality of users to enjoy the game simultaneously.

A description will be given below of the button configuration of the game controller 6.

[Configuration of the Top Face]

FIG. 2(a) illustrates the top face of the game controller 6. The user holds a left grip section 78b with the left hand and a right grip section 78a with the right hand to operate the game controller 6. Directional buttons 71, analog sticks 77a and 77*b*, and action buttons 76, each being an input section, are provided on the top face of the enclosure of the game controller 6. The directional buttons 71 include Up, Left, Down, and Right buttons 71*a*, 71*b*, 71*c*, and 71*d*. The four action buttons 76 are marked with graphics in different colors to distinguish themselves from each other. That is, a Circle button 72 is marked with a red circle, a Cross button 73 with a blue cross, a Square button 74 with a purple square, and a Triangle button 75 with a green triangle. The right and left analog sticks 77*a* and 77*b* are tilted to enter a direction and an amount of tilt. It should be noted that the right and left analog sticks 77*a* and 77*b* also serve as push-down buttons adapted to sink in when pressed by the user and return to their original positions when released by the user. Hereinafter, the button function achieved by pushing down the right analog stick 77*a* will be referred to as an R3 button, and that achieved by pushing down the left analog stick 77*b* will be referred to as an L3 button. A touch pad 79 is provided in a flat area between the directional buttons 71 and the action buttons 76 on the top face of the enclosure. The touch pad 79 also serves as a push-down button adapted to sink in when pressed by the user and return to its original position when released by the user.

A Home button 80 is provided between the right and left analog sticks 77*a* and 77*b*. The Home button 80 is used to turn ON the power for the game controller 6 and simultaneously activate the communication function for wirelessly communicating with the information processing device 10. After the game controller 6 has connected to the information processing device 10, the Home button 80 is used also to shown the menu screen on the information processing device 10.

A SHARE button 81 is provided on the left side of the touch pad 79. The SHARE button 81 is used to enter a user instruction directed to the OS or system software in the information processing device 10. An OPTIONS button 82 is provided on the right side of the touch pad 79. The OPTIONS button 82 is used to enter a user instruction directed to the application (game) executed in the information processing device 10. Both of the SHARE and OPTIONS buttons 81 and 82 may be formed as pushbuttons.

[Configuration of the Far Side Face]

FIG. 2(*b*) illustrates the far side face of the game controller 6. The touch pad 79 is provided on the top side of the far side face of the enclosure of the game controller 6 in such a manner as to bend and extend from the top face of the enclosure, with an oblong light-emitting section 85 provided on the bottom side of the far side face of the enclosure. The light-emitting section 85 has red (R), green (G), and blue (B) LEDs, lighting up in accordance with emission color information transmitted from the information processing device 10. On the far side face of the enclosure, R1, R2, L1, and L2 buttons 83*a*, 84*a*, 83*b*, and 84*b* are provided in such a manner as to be bilaterally symmetrical in the longitudinal direction. The R1 and R2 buttons 83*a* and 84*a* are operated respectively by the index and middle fingers of the user's right hand. The L1 and L2 buttons 83*b* and 84*b* are operated respectively by the index and middle fingers of the user's left hand. The R1 and L1 buttons 83*a* and 83*b* on the top may be configured as pushbuttons, and the R2 and L2 buttons 84*a* and 84*b* on the bottom as trigger buttons that are rotationally supported.

The button configuration of the game controller 6 has been shown above with reference to FIGS. 2(*a*) and 2(*b*). The game controller 6 includes a variety of input sections (buttons). The user operates each of the buttons while at the same time watching the menu or game screen.

Figure 3:
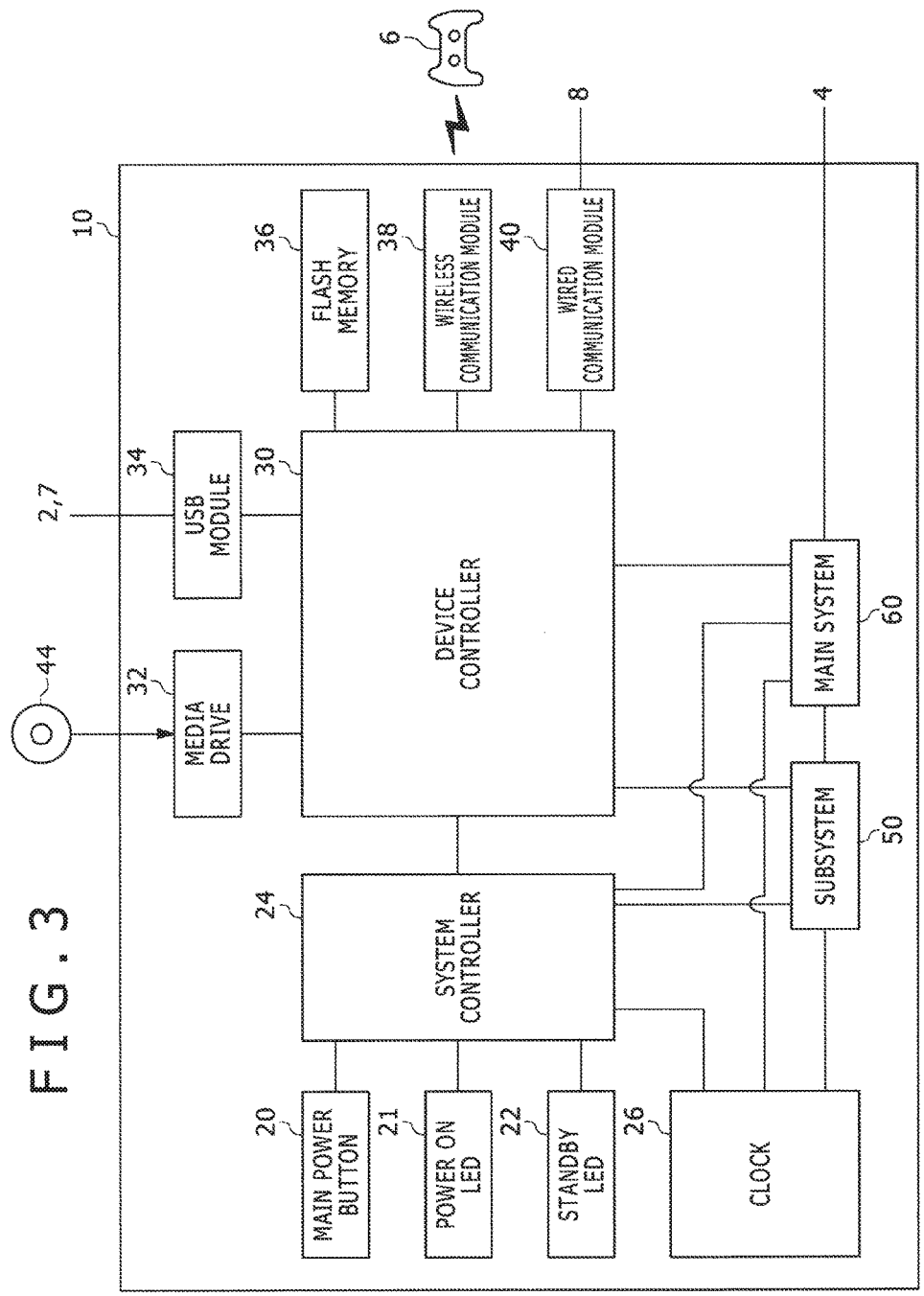
FIG. 3 is a diagram illustrating functional blocks of an information processing device.

FIG. 3 illustrates functional blocks of the information processing device 10. The information processing device 10 includes a main power button 20, a power ON LED 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory, i.e., a main storage device, a memory controller, a GPU (Graphics Processing Unit), and so on. The GPU is used primarily for arithmetic operations in game programs. These functions may be formed in a single chip as a system-on-chip. The main CPU has a function to start the OS and execute applications installed in the auxiliary storage device 2 in the environment provided by the OS.

The subsystem 50 includes a sub CPU, a memory, i.e., a main storage device, a memory controller, and so on, but not a GPU. The circuit gate count of the sub CPU is smaller than that of the main CPU, and the sub CPU consumes less power during operation than the main CPU. As descried above, the sub CPU is designed to be operational when the main CPU is on standby, with the processing capability thereof being limited for minimal power consumption. It should be noted that the sub CPU and the memory may be formed in a separate chip.

The main power button 20 is an input section for the user to make an operational input. The main power button 20 is provided on the front face of the enclosure of the information processing device 10 and is operated to turn ON or OFF the power supply for the main system 60 of the information processing device 10. Hereinafter, the expression "the main power is ON" refers to the fact that the main system 60 is in active mode, and the expression "the main power is OFF" refers to the fact that the main system 60 is in standby mode. The power ON LED 21 lights up when the main power button 20 is switched ON. The standby LED 22 lights up when the main power button 20 is switched OFF.

The system controller 24 detects the pressing of the main power button 20 by the user. If the main power button 20 is pressed when the main power is OFF, the system controller 24 acquires the pressing as a "switch-ON instruction." On the other hand, if the main power button 20 is pressed when the main power is ON, the system controller 24 acquires the pressing as a "switch-OFF instruction."

The main CPU has a function to execute applications installed in the auxiliary storage device 2 and the ROM media 44. On the other hand, the sub CPU does not have such a function. However, the sub CPU has a function to access the auxiliary storage device 2 and a function to exchange data with an external server. The sub CPU includes only such limited processing functions, thus allowing it to operate with less power consumption than the main CPU. These functions of the sub CPU are activated when the main CPU is on standby. In the information processing device 10, the subsystem 50 remains operational when the main system 60 is on standby, thus maintaining the information processing device 10 signed into the network service provided by the external server.

The clock 26 is a realtime clock adapted to create current date/time information and supply this information to the system controller 24, the subsystem 50, and the main system 60.

The device controller 30 is configured as an LSI (Large-Scale Integrated Circuit) adapted to transfer information between devices as does a southbridge. As illustrated, the system controller 24, the media drive 32, the USB module 34, the flash memory 36, the wireless communication module 38, the wired communication module 40, the subsystem 50, the main system 60, and other devices are connected to the device controller 30. The device controller 30 accommodates the differences in electrical characteristic and data transfer rate between the devices, thus controlling the data transfer timings.

The media drive 32 receives the ROM media 44 that stores application software such as game and license information, driving the ROM media 44 and reading the program and data therefrom. The ROM media 44 is a read-only recording media such as optical disk, magneto-optical disk, or Blu-ray disc.

The USB module 34 is connected to external equipment by a USB cable. The USB module 34 may be connected to the auxiliary storage device 2 and the camera 7 by a USB cable. The flash memory 36 is an auxiliary storage device that makes up an internal storage. The wireless communication module 38 communicates wirelessly, for example, with the game controller 6 using a communication protocol such as Bluetooth (registered trademark) protocol or IEEE802.11 protocol. It should be noted that the wireless communication module 38 may support the third generation digital mobile phone system compliant with the IMT-2000 (International Mobile Telecommunication 2000) standard defined by the ITU (International Telecommunication Union). Further, the wireless communication module 38 may support a digital mobile phone system of other generation. The wired communication module 40 communicates with external equipment in a wired manner, connecting to the network, for example, via the AP 8.

A description will be given next of the button configuration of the portable terminal device 200.

[Configuration of the Front Face Portion]

FIG. 4(a) illustrates the front face of the portable terminal device 200. The portable terminal device 200 is formed by an oblong enclosure. Each of the left and right areas held by the user has an arc-shaped outer contour. A rectangular touch panel 250 is provided on the front face of the portable terminal device 200. The touch panel 250 includes a display device 220 and a transparent front face touch pad 221 that covers the surface of the display device 220. The display device 220 is an organic EL (Electro-Liminescence) panel, showing images. It should be noted that the display device 220 may be a liquid crystal panel or other display means. The front face touch pad 221 is a multi-touch pad having a function to detect a plurality of simultaneously touched points so that the touch panel 250 is configured as a multi-touch screen.

Triangle, Circle, Cross, and Square buttons 222a, 222b, 222c, and 222d (hereinafter referred to as "action buttons 222" if done so collectively) are provided on the right side of the touch panel 250, with each of these buttons located at a vertex of a rhombus. Up, Left, Down, and Right buttons 223a, 223b, 223c, and 223d (hereinafter referred to as "directional buttons 223" if done so collectively) are provided on the left side of the touch panel 250. The user can enter eight directions, namely, up, down, left, right, and diagonal directions by operating the directional buttons 223. A left analog stick 224b is provided below the directional buttons 223, and a right analog stick 224a is provided below the action buttons 222. The user enters a direction and an amount of tilt by tilting the right analog stick 224a or left analog stick 224b. L and R buttons 226b and 226a are provided respectively at left and right vertex portions of the enclosure. The action buttons 222, the directional buttons 223, the analog sticks 224, the L and R buttons 226b and 226a, and the front face touch pad 221 make up the input sections operated by the user.

A front face camera 230 is provided near the action buttons 222. Left and right speakers 225b and 225a are provided respectively on the left side of the left analog stick 224b and on the right side of the right analog stick 224a to produce sounds. Further, a Home button 227 is provided below the left analog stick 224b, and a START button 228 and a SELECT button 229 are provided below the right analog stick 224a. The Home button 227, the START button 228, and the SELECT button 229 also make up the input sections operated by the user.

[Configuration of the Rear Face Portion]

FIG. 4(b) illustrates the rear face of the portable terminal device 200. A rear face camera 231 and a rear face touch pad 232 are provided on the rear face of the portable terminal device 200. The rear face touch pad 232 is formed as a multi-touch pad as is the front face touch pad 221, making up an input section operated by the user. The portable terminal device 200 has two cameras and two touch pads on the front and rear faces thereof.

Comparing the button configuration of the game controller 6 shown in FIGS. 2(a) and 2(b) with that of the portable terminal device 200 shown in FIGS. 4(a) and 4(b), some buttons can be intuitively considered identical by the user. However, there are other buttons that are available on the game controller 6, but not on the portable terminal device 200. For example, the directional buttons 223 and the action buttons 222 of the portable terminal device 200 can be considered identical to the directional buttons 71 and the action buttons 76 of the game controller 6, respectively. Further, although not completely identical, the R and L buttons 226a and 226b of the portable terminal device 200 can be intuitively considered identical to the R1 and L1 buttons 83a and 83b of the game controller 6 by the user. These buttons are arranged at positions similar to each other. Further, they are substantially identical to or closely resemble each other in appearance. Therefore, if the portable terminal device 200 is used as a controller of the information processing device 10, the user can experience the same operating sensation as with the game controller 6 in using the directional buttons 223, the action buttons 222, and the R and L buttons 226a and 226b.

On the other hand, the portable terminal device 200 has no buttons that correspond, for example, to the R2 and L2 buttons 84a and 84b of the game controller 6. Therefore, if the portable terminal device 200 is used as a controller of the information processing device 10, the information processing device 10 should preferably notify the user of the correspondence that shows which input sections the functions of the R2 and L2 buttons 84a and 84b of the game controller 6 are assigned to.

In the present embodiment, the user transmits a connection request to the information processing device 10 first by operating the portable terminal device 200 so as to engage in Remote Play. At this time, if the main power is OFF for the information processing device 10, the main system 60 is started on the basis of the connection request. When started, the main system 60 generates menu image data containing, for example, game icons, transmitting the data to the portable terminal device 200. Then the portable terminal device 200 shows a menu screen on the display device 220. When the user selects a desired game icon on the menu screen, the portable terminal device 200 transmits the operation information to the information processing device 10. The information processing device 10 starts the selected game, generating game image data and transmitting the data to the portable terminal device 200. The portable terminal device 200 shows the game image on the display device 220.

Thus, in Remote Play, the display device 220 of the portable terminal device 200 shows a menu screen generated by the OS of the information processing device 10 and an application screen generated by an application such as game. The user operates the input sections of the portable terminal device 200 while at the same time watching the screens shown on the display device 220. As described earlier, the functions of the input sections of the game controller 6 are assigned to those of the portable terminal device 200 in Remote Play. However, the functions of the input sections of the game controller 6 may be assigned to different input sections of the portable terminal device 200 for the operation of the menu and application screens. Hereinafter, the assignment of the functions of the input sections of the game controller 6 to those of the portable terminal device 200 may be referred to as "input assignment" or "button assignment."

In the information processing system 1, the information processing device 10 stores a default input assignment correspondence. In the embodiment, we assume that an input assignment correspondence is set in advance. However, a plurality of types of standard input assignments may be set so that the user or application can select one thereof. Hereinafter, standard input assignment will be referred to as "standard assignment." The user operates the menu screen by using the portable terminal device 200 with a standard assignment.

It should be noted that, in the information processing system 1, a game can, on its own, assign the input sections of the game controller 6 to those of the portable terminal device 200. Normally, games are created on the basis of the premise that the user operates the game controller 6. Therefore, when the user operates the portable terminal device 200 in Remote Play, it is generally considered preferable to assign, to the extent possible, the button functions of the game controller 6 to those buttons that can be intuitively identified by the user as corresponding buttons. The above standard assignment correspondence is set on the basis of such a policy. This allows the user to operate the input sections of the portable terminal device 200 without much trouble, albeit with subtle differences, if the portable terminal device 200 with a standard assignment is used.

However, the portable terminal device 200 has the front and rear face touch pads 221 and 232. During Remote Play, therefore, operation information different from the game controller 6 can be entered. Taking advantage of such differences in input sections between the game controller 6 and the portable terminal device 200, games can provide the user with a new operating sensation using the input sections of the portable terminal device 200. For example, the function of the Circle button 72 of the game controller 6 is assigned to a different input section rather than to the Circle button 222b of the portable terminal device 200, providing a new previously unknown game-playing sensation.

Figure 5:
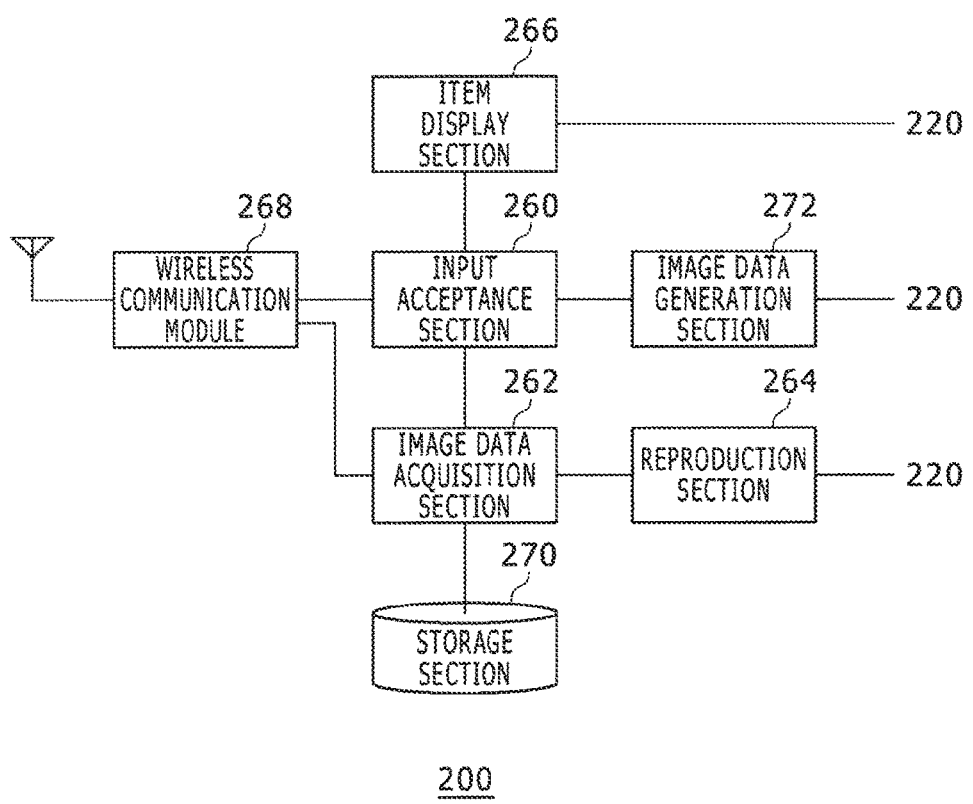
FIG. 5 is a diagram illustrating a configuration of the portable terminal device serving as a controller.

FIG. 5 illustrates a configuration of the portable terminal device 200 serving as a controller. The portable terminal device 200 includes an input acceptance section 260, an image data acquisition section 262, a reproduction section 264, an item display section 266, a wireless communication module 268, an image data generation section 272, and a storage section 270. The input acceptance section 260 accepts inputs from a variety of input sections. The wireless communication module 268 transmits operation information to the information processing device 10 and receives image data from the information processing device 10. The image data acquisition section 262 acquires the received image data, and the reproduction section 264 reproduces the image data, showing the data on the display device 220. The image data generation section 272 generates image data for the portable terminal device 200. Such image data includes menu, application top, and application screens for the portable terminal device 200. During Remote Play, the image data acquisition section 262 acquires image data from the information processing device 10, and the reproduction section 264 reproduces the acquired data, thus showing the data on the display device 220. During normal play other than Remote Play, the image data generation section 272 generates image data for the portable terminal device 200, showing the data on the display device 220.

In FIG. 5, each of the components described as functional blocks adapted to perform a variety of processing tasks can be configured with circuit blocks, memories, and other LSIs in terms of hardware, and by a program loaded into the memory in terms of software. Therefore, it is understood by those skilled in the art that these functional blocks can be implemented in a variety of ways by hardware alone, software alone, or by a combination thereof and are not limited to any one of them.

Figure 6:
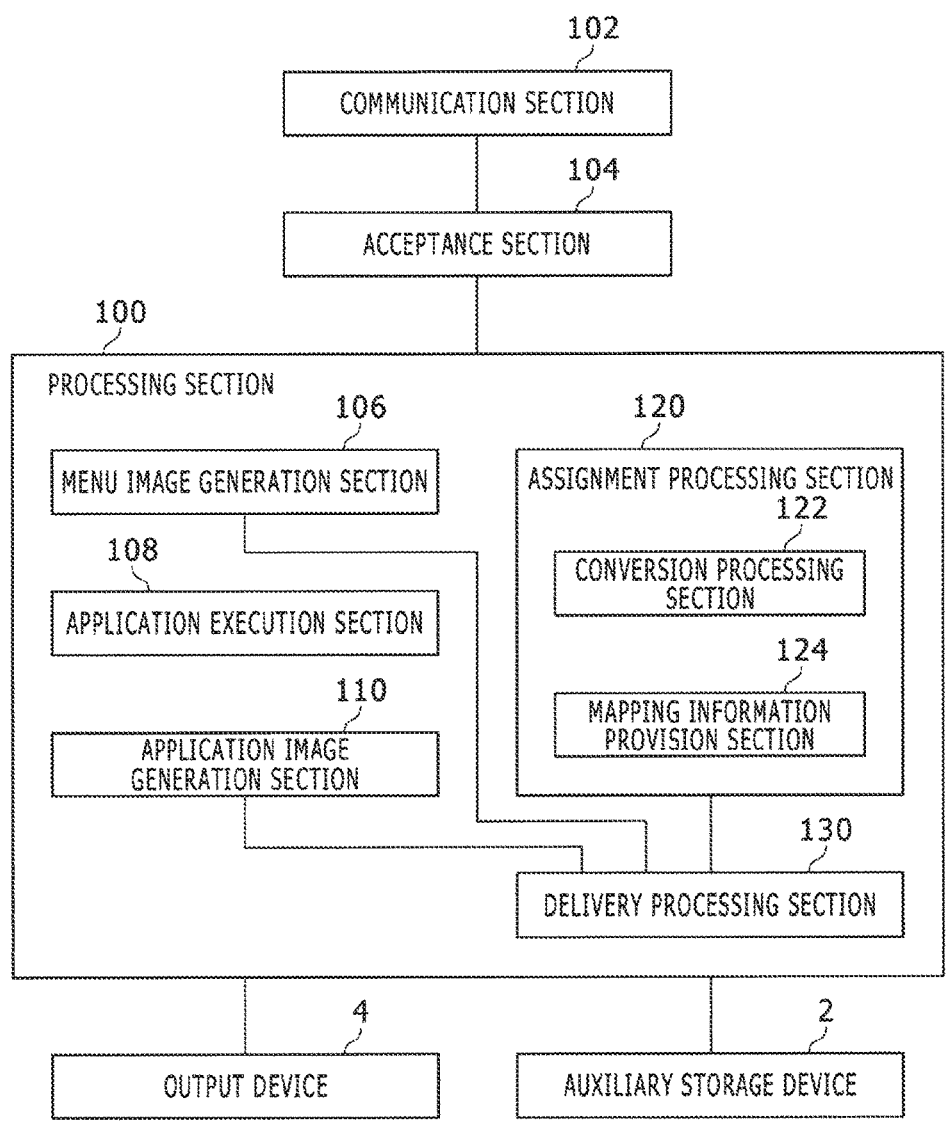
FIG. 6 is a diagram illustrating a configuration of the information processing device.

FIG. 6 illustrates a configuration of the information processing device 10. The information processing device 10 includes a processing section 100, a communication section 102, and an acceptance section 104. The processing section 100 includes a menu image generation section 106, an application execution section 108, an application image generation section 110, an assignment processing section 120, and a delivery processing section 130. The application execution section 108 has a function to start the start file of an application, thus executing the application program. Here, the application execution section 108 is represented as including the functions implemented by the application program. The assignment processing section 120 includes a conversion processing section 122 and a mapping information provision section 124 and has a function to adjust operation information provided by the portable terminal device 200.

In FIG. 6, each of the components described as functional blocks adapted to perform a variety of processing tasks can be configured with circuit blocks, memories, and other LSIs in terms of hardware, and by a program loaded into the memory in terms of software. Therefore, it is understood by those skilled in the art that these functional blocks can be implemented in a variety of ways by hardware alone, software alone, or by a combination thereof and are not limited to any one of them.

During Remote Play, the communication section 102 receives information about operation of the input sections of the portable terminal device 200 by the user (hereinafter referred to as "operation information") and transmits, to the portable terminal device 200, image data generated by the processing section 100. The communication section 102 is represented as including the functions of the wireless communication module 38 and the wired communication module 40 illustrated in FIG. 3.

The acceptance section 104 is provided between the communication section 102 and the processing section 100, transferring data or information between the communication section 102 and the processing section 100. When the acceptance section 104 accepts operation information of an input section of the portable terminal device 200 via the communication section 102, the acceptance section 104 supplies the operation information to the assignment processing section 120 of the processing section 100.

The menu image generation section 106 generates menu image data containing, for example, application icon images, showing the data on the output device 4. The application image generation section 110 generates application image data indicating processing results of an application program, showing the data on the output device 4. In the information processing system 1 of the present embodiment, image data generated by the processing section 100 is transmitted from the communication section 102 to the portable terminal device 200. In the display device 200, the image data acquisition section 262 acquires the image data, and the reproduction section 264 reproduces the image data, showing the data on the display device 220. Therefore, the same image appears on the output device 4 and the display device 220. A description will be given below of the operation of the information processing device 10 on the basis of the images that appear on the display device 220.

Figure 7:
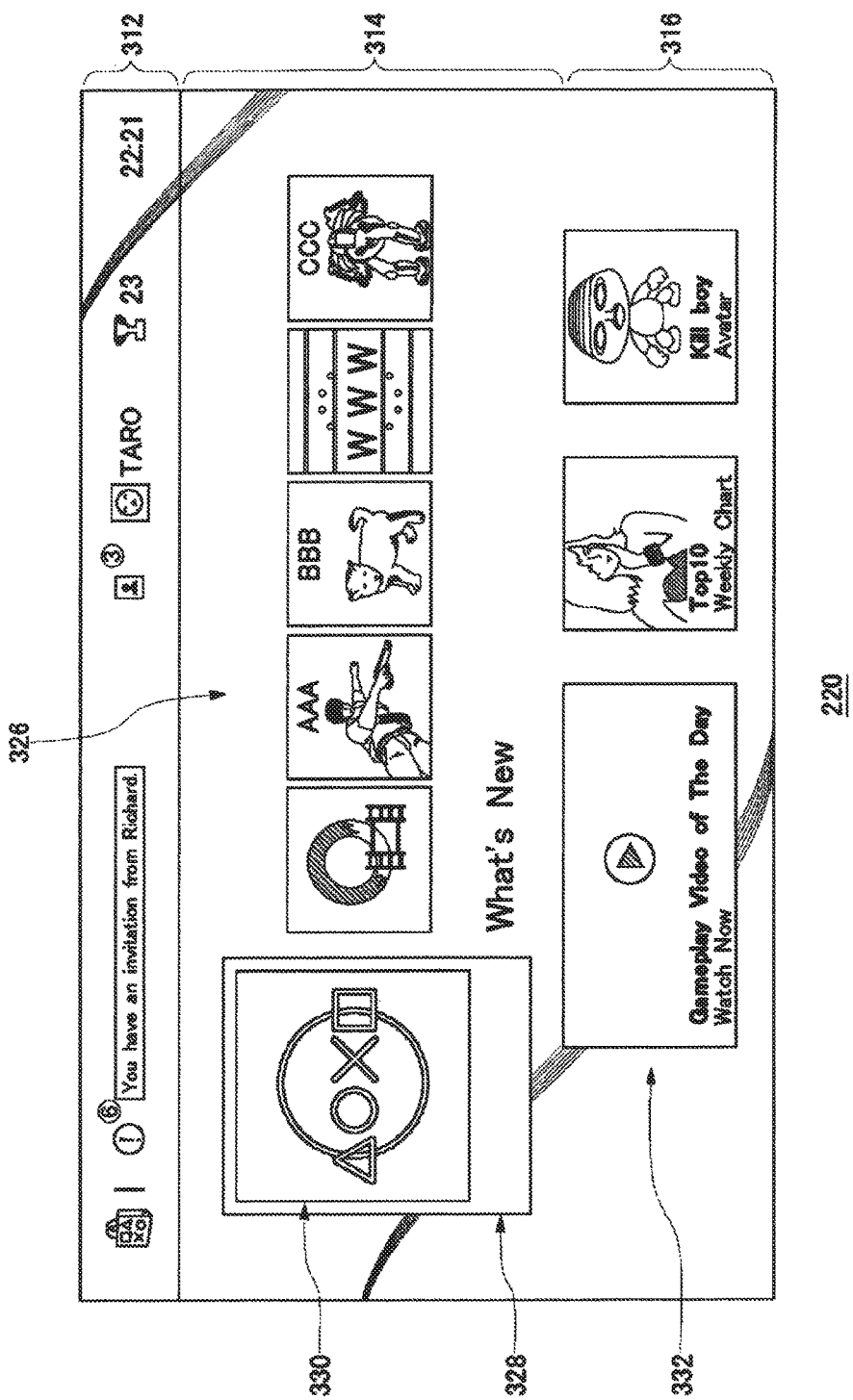
FIG. 7 is a diagram illustrating an example of a menu screen appearing on a display device.

FIG. 7 illustrates an example of a menu screen appearing on the display device 220 during Remote Play. The menu image generation section 106 arranges a what's new icon 330 at the top (i.e., left end) of a row of icons. When a menu screen is shown for the first time, the menu image generation section 106 places the what's new icon 330 within a focus region 328 in a content area 314, thus making the what's new icon 330 focused. The menu image generation section 106 arranges content icons 326 from the second place onwards in the row of icons in the order of most to least recent date and time of access from the current date and time on the basis of the date and time when each application or each piece of content was accessed by the user. Further, when the what's new icon 330 is arranged in the focus region 328, the menu image generation section 106 arranges a live information item 332 in a live area 316. Still further, the menu image generation section 106 arranges some of a plurality of system function icons in a system area 312. The plurality of system functions icons represent a plurality of system functions provided by the information processing device 10. It should be noted that the content icon arranged in the focus region 328 is selected by pressing the enter button (e.g., Circle button 222b) of the portable terminal device 200. This operation information is transmitted to the information processing device 10, causing the application execution section 108 to start the application associated with the content icon.

When the menu image generation section 106 generates menu image data, the delivery processing section 130 transmits the menu image data from the communication section 102 to the portable terminal device 200. When the wireless communication module 268 of the portable terminal device 200 receives image data, the image data acquisition section 262 acquires menu image data, and the reproduction section 264 reproduces the menu screen, showing the screen on the display device 220.

When the user presses a given button (Home button 227) of the menu screen, the input acceptance section 260 accepts the button operation, and the item display section 266 shows a toolbar that contains a plurality of items. The items in the toolbar may be shown as selectable icons so that the user can select and execute the item associated with an icon by tapping the icon or operating the directional buttons 223 and pressing the enter button (e.g., Circle button 222b). Each of the icons shown in the toolbar serves as a software input section. It should be noted that the toolbar is hidden when the user presses a given button.

Figure 8:
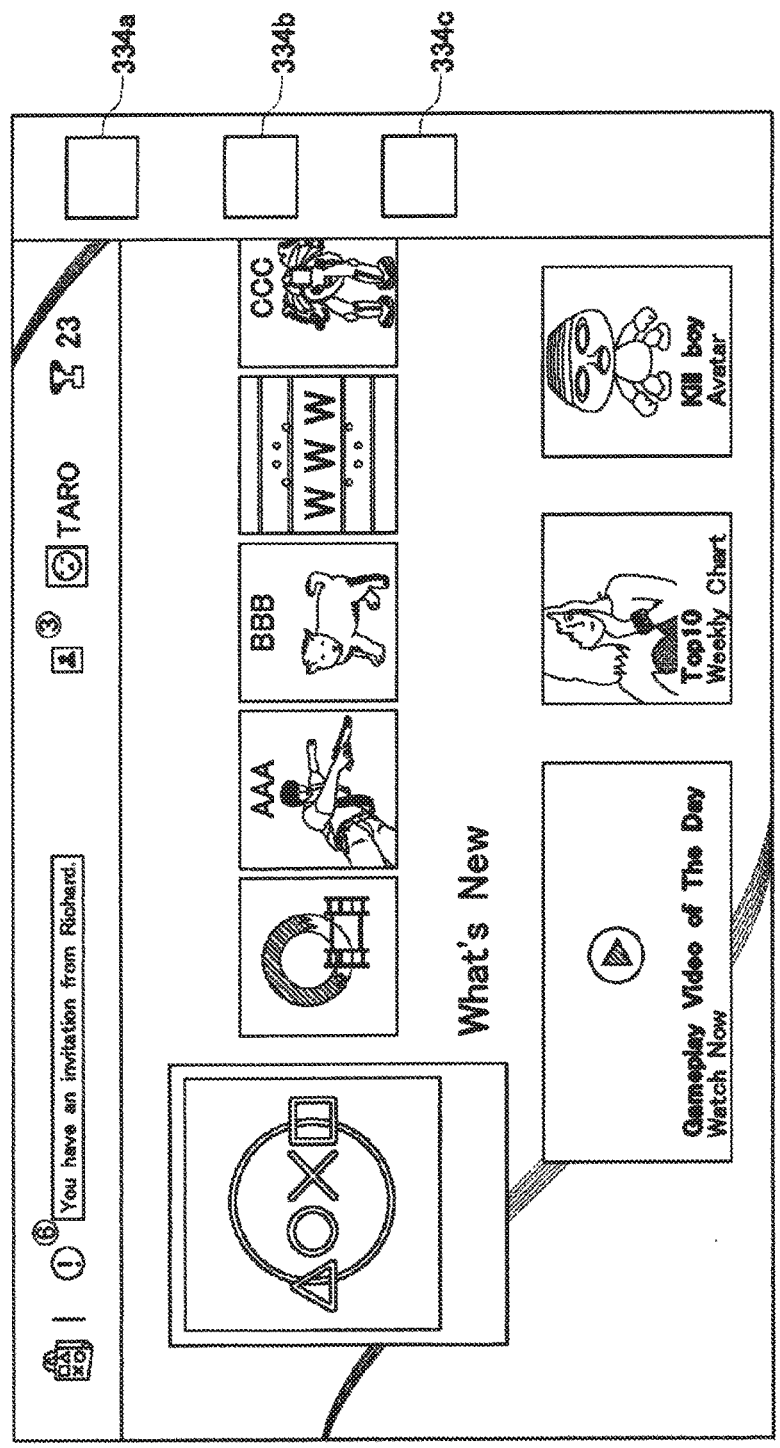
FIG. 8 is a diagram illustrating a toolbar that contains a plurality of items shown on the menu screen.

FIG. 8 illustrates a toolbar that contains a plurality of items shown on the menu screen. Although shown in a superimposed manner on the right edge of the menu screen in FIG. 8, the toolbar may be shown in a superimposed manner on the bottom edge of the menu screen. The toolbar contains a terminal device icon 334a, a Home icon 334b, and a button guide icon 334c.

The terminal device icon 334a is designed to show a screen about the portable terminal device 200. The terminal device icon 334a is assigned the function of the Home button 227 of the portable terminal device 200. When the user selects the terminal device icon 334a, the same processing is performed as when the Home button 227 is pressed at a time other than during Remote Play. More specifically, when the user presses the terminal device icon 334a, the system software of the portable terminal device 200 temporarily suspends Remote Play. As a result, the Home screen of the portable terminal device 200 or the top screen of the application appears on the display device 220.

During Remote Play, the Home button 227 of the portable terminal device 200 is assigned a function to show the toolbar illustrated in FIG. 8 as described above. Therefore, it is necessary to assign the function of the Home button 227 separately to one of the input sections during Remote Play. In the present embodiment, therefore, the terminal device icon 334a appears in the toolbar that is shown when the Home button 227 is pressed. The function of the Home button 227 is assigned to the terminal device icon 334a in a software manner. This allows the user to show a screen about the portable terminal device 200 by selecting the terminal device icon 334a.

The Home icon 334b is assigned the function of the Home button 80 of the game controller 6. When the Home icon 334b is selected in the menu screen shown on the display device 220, the same processing is performed as when the user presses the Home button 80 of the game controller 6 on the menu screen of the information processing device 10 appearing on the output device 4.

As described above, during Remote Play, the function of the Home button 227 of the portable terminal device 200 and that of the Home button 80 of the game controller 6 are assigned, in a software manner, to the terminal device icon 334a and the Home icon 334b in the toolbar, respectively. The terminal device icon 334a acts on the system software of the portable terminal device 200, whereas the Home icon 334b acts on the system software of the information processing device 10. The user can select which piece of system software to activate, i.e., the system software of the portable terminal device 200 or that of the information processing device 10, in the single display area (toolbar). The Home button 227 of the portable terminal device 200 and the Home button 80 of the game controller 6 are available as the buttons of the same kind, performing such tasks as showing system screens for the portable terminal device 200 and the information processing device 10, respectively. During Remote Play, the user wishes to find out, with ease, which input sections the button functions of the Home buttons 227 and 80 are assigned to when the user desires to view the system screen in the information processing device 10 or the portable terminal device 200.

Although, during Remote Play, either the button function of the Home button 227 or 80 can be assigned directly to the Home button 227, it is difficult, in that case, for the user to find out which input section the button function of the other is assigned to. For this reason, in the present embodiment, the button function of the Home button 227 or 80 is set up in an icon of a common toolbar, with the Home button 227 serving as an entrance for showing that toolbar, thus providing an easy-to-use user interface for the user.

The button guide icon 334c is designed to show an input mapping chart. When the button guide icon 334c is selected, a chart appears to show a standard assignment correspondence set up for operation of the information processing device 10.

FIG. 9 illustrates an input assignment correspondence table. Here, an input assignment correspondence table that has been set up as a default for operation of the menu screen is shown. The portable terminal device 200 stores image data of the correspondence table shown in FIG. 9 in the storage section 270. When the input acceptance section 260 accepts an operation of selecting the button guide icon 334c in the toolbar, the image data acquisition section 262 reads correspondence table data from the storage section 270, and the reproduction section 264 shows the input assignment correspondence table on the display device 220.

The correspondence table shows a correspondence diagram 340 and a rear face touch pad diagram 342. In the correspondence diagram 340, the input sections of the game controller 6 are shown in the left column, and those of the portable terminal device 200 are shown in the right column so that the input sections shown in the same rows correspond to each other. The correspondence diagram 340 represents which input section of the portable terminal device 200 each input section of the game controller 6 corresponds to. However, it is obvious that the directional buttons 71, the action buttons 76, and the right and left analog sticks 77a and 77b of the game controller 6 correspond to the directional buttons 223, the action buttons 222, and the right and left analog sticks 224a and 224b of the portable terminal device 200 as similar buttons. Therefore, the correspondence between these buttons may be omitted from the correspondence diagram 340 so that only the correspondence between the input sections that is difficult to discern may be represented in the correspondence diagram 340.

Among the input sections between whose correspondence is difficult to discern by the user are the R1, L1, R2, and L2 buttons 83a, 83b, 84a, and 84b, the R3 button, the push-down button of the right analog stick 77a, the L3 button, the push-down button of the left analog stick 77b, the SHARE button 81, the OPTIONS button 82, and the touch pad 79 of the game controller 6. For this reason, the correspondence diagram 340 may show only the correspondence of these input sections.

In FIG. 9, the rear face touch pad diagram 342 visually represents the assignment of the functions of the R2, L2, R3, and L3 buttons of the game controller 6 to the rear face touch pad 232. Here, the functions of the R2, L2, R3, and L3 buttons are assigned respectively to the top left, top right, bottom left, and bottom right areas of the rear face touch pad 232. The portable terminal device 200 has no buttons that correspond to the R2, L2, R3, and L3 buttons of the game controller 6. Therefore, these button functions are assigned in a software manner using the rear face touch pad 232. It should be noted that the function of the Home button 80 of the game controller 6 is assigned, in a software manner, to the Home icon 334b in the toolbar that appears when the Home button 227 is pressed as described above.

Thus, the user can view the input assignment correspondence table by showing the toolbar on the menu screen and selecting the button guide icon 334c. This allows the user to verify, with ease, the standard assignment correspondence table when he or she is at a loss as to the operation of the menu screen of the portable terminal device 200.

Figure 10:
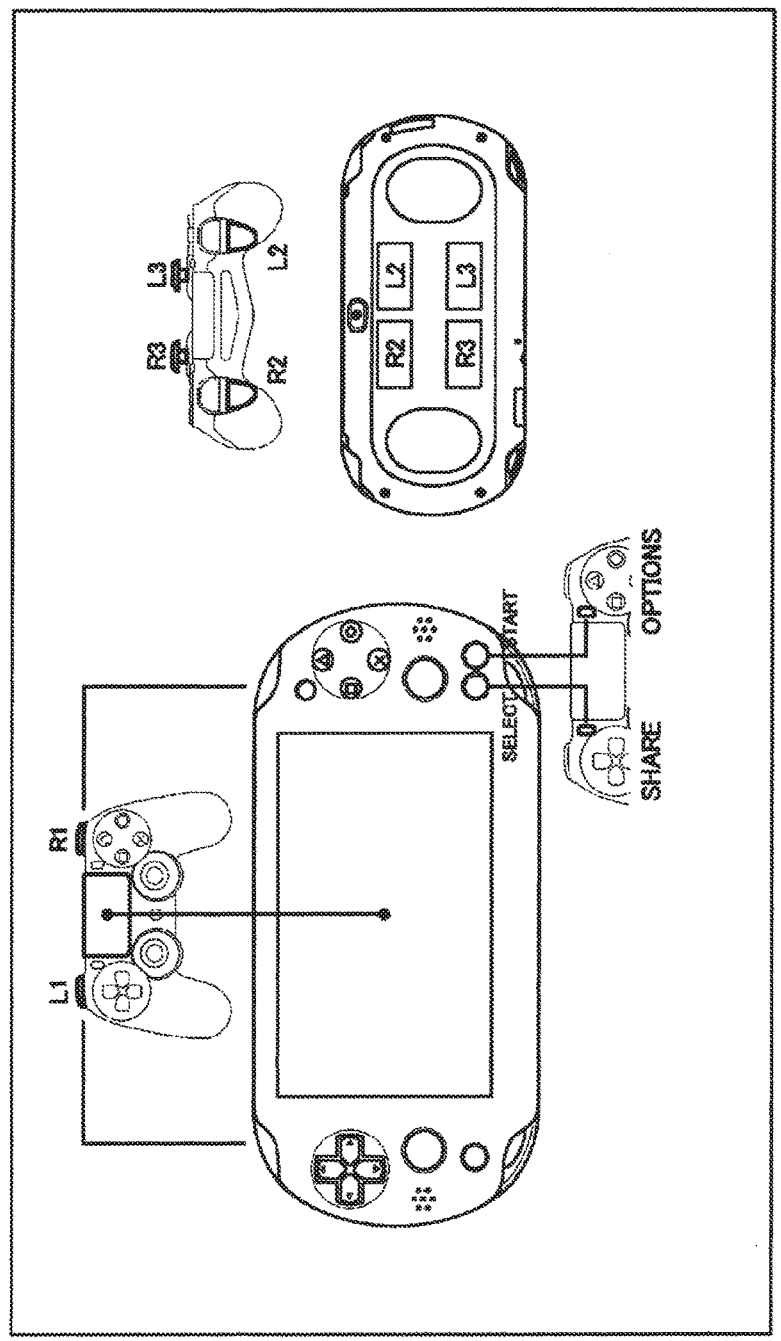
FIG. 10 is a diagram illustrating another example of the input assignment correspondence diagram.

FIG. 10 illustrates another example of the input assignment correspondence table. This example represents a correspondence between the input sections of the game controller 6 and those of the portable terminal device 200 as a standard input assignment correspondence table set up for operation of the menu screen. This correspondence diagram represents a correspondence of the input sections of the game controller 6 which are non-existent on the portable terminal device 200. More specifically, the relationship is visually represented between the R1, L1, R2, and L2 buttons 83a, 83b, 84a, and 84b, the R3 button, the push-down button of the right analog stick 77a, the L3 button, the push-down button of the left analog stick 77b, the SHARE button 81, the OPTIONS button 82, and the touch pad 79 of the game controller 6 and the input sections of the portable terminal device 200. The user can confirm, with ease, the input section to operate by viewing this correspondence diagram.

When the user arranges a desired content icon in the focus region 328 and presses the enter button (e.g., Circle button 222b) in the menu screen, the wireless communication module 268 transmits, to the information processing device 10, information about operation of the enter button. It should be noted that information is added to this operation information. Additional information identifies that the sender is the portable terminal device 200. In the information processing device 10, the acceptance section 104 accepts operation information via the communication section 102, supplying the information to the assignment processing section 120. The conversion processing section 122 of the assignment processing section 120 is aware of the standard assignment correspondence. When determining that the operation information was sent from the portable terminal device 200, the conversion processing section 122 converts the operation information of the Circle button 222b of the portable terminal device 200 into that of the Circle button 72 of the game controller 6, supplying the operation information to the application execution section 108 together with information indicating that the operation information is that of the portable terminal device 200. As a result, the application execution section 108 recognizes that the Circle button 72 of the game controller 6 has been operated, reading the start file of the application from the auxiliary storage device 2 and starting and executing the application program. This initiates the processing of the application.

Although FIGS. 9 and 10 illustrate examples of standard assignment correspondence diagrams, an input assignment of its own can be made available with the game in Remote Play as described above. The input assignment correspondence made available by a game is set up by that game. Therefore, the portable terminal device 200 is not stored image data for presenting the correspondence to the user in the storage section 270. For this reason, the information processing device 10 transmits the input assignment correspondence table for the game to the portable terminal device 200 in response to a user request so that the reproduction section 264 of the portable terminal device 200 can show the correspondence table on the display device 220.

In the information processing device 10, the acceptance section 104 accepts operation information from the user-operated portable terminal device 200 via the communication section 102. The application execution section 108 executes an application in accordance with the operation information accepted by the acceptance section 104. If the application is a game, the application execution section 108 performs arithmetic operations for moving game characters in a virtual space on the basis of operation information entered into the portable terminal device 200. The application execution section 108 may be an application (game program) itself. The application image generation section 110 may be a GPU (Graphics Processing Unit) adapted to handle rendering or other processing, generating application (game) image data to be shown on the output device 4 in response to processing results of the application execution section 108.

The delivery processing section 130 transmits the application image data, generated by the application image generation section 110, to the portable terminal device 200. In the portable terminal device 200, the image data acquisition section 262 acquires the application image data via the wireless communication module 268, and the reproduction section 264 shows the application image on the display device 220. This ensures that the same application image appears on the output device 4 and the display device 220.

If an input assignment of its own is available with the application in Remote Play, the application has an input assignment correspondence and input assignment information for indicating the correspondence to the user. It should be noted that even if an input assignment of its own is not available with the application in Remote Play, and, as a result, the application obeys the above standard input assignment, the application may have that input assignment correspondence and input assignment information. This input assignment information may be available in the form of image files of the correspondence diagrams shown in FIGS. 9 and 10.

It should be noted that although input assignment information is prepared as correspondence diagrams each representing a correspondence between the input sections of the game controller 6 and those of the portable terminal device 200 in FIGS. 9 and 10, input assignment information presented to the user by the application may be prepared as a correspondence diagram representing a correspondence between the input sections of the portable terminal device 200 and command information of the application. The reason for this is that the user can more accurately find out which input sections to operate in the application by viewing the correspondence diagram representing the correspondence between the input sections of the portable terminal device 200 and command information. It should be noted that input assignment information presented to the user by the application may be a correspondence diagram representing a correspondence between the input sections of the game controller 6 and those of the portable terminal device 200. Those users who have already played a game using the game controller 6 understand the correspondence between the input sections of the game controller 6 and command information of the application. If such users understand the differences between the input sections of the game controller 6 and those of the portable terminal device 200, they can operate the application using the portable terminal device 200. As input assignment information, therefore, a correspondence diagram representing a correspondence between the input sections of the game controller 6 and those of the portable terminal device 200 may be available rather than a correspondence between the input sections of the portable terminal device 200 and command information. It should be noted that these two kinds of correspondence diagrams may be available, and that both of these diagrams may be provided to the user.

Although, in the present embodiment, the application is stored (installed) in the auxiliary storage device 2, a storage section, input assignment information is held, at the time of storage, in a given folder associated with information identifying the application such as the title ID of the application. It should be noted that the application may be stored in a ROM media 44 (refer to FIG. 3). In that case, input assignment information is held in a given folder of the ROM media 44.

When the input acceptance section 260 accepts an input assignment information acquisition request to the portable terminal device 200 while the user is playing a game in Remote Play, the wireless communication module 268 transmits the request to the information processing device 10. This input assignment information acquisition request is generated by the user pressing a given button of the portable terminal device 200 and transmitted to the information processing device 10 together with the application ID and information identifying the portable terminal device 200. It should be noted that an input assignment information acquisition request may be generated by the user pressing the Home button 227 on the game screen and selecting the button guide icon 334c of the toolbar shown in a superimposed manner on the game screen.

When the acceptance section 104 accepts an input assignment information acquisition request in the information processing device 10, the mapping information provision section 124 reads input assignment information of the application under execution from the auxiliary storage device 2 or a given folder of the ROM media 44 using the application ID included in the input assignment information acquisition request. It should be noted that if two kinds of information, one representing a correspondence between the input sections of the portable terminal device 200 and command information and another representing a correspondence between the input sections of the game controller 6 and those of the portable terminal device 200, are held in the storage section as input assignment information, the mapping information provision section 124 may read out the two kinds of information. The mapping information provision section 124 provides the input assignment information to the delivery processing section 130, and the delivery processing section 130 transmits the provided information to the portable terminal device 200 via the communication section 102.

In the portable terminal device 200, the image data acquisition section 262 acquires input assignment information. Such information is provided in the form of an image file, and the reproduction section 264 shows the input assignment information on the display device 220.

Figure 11:
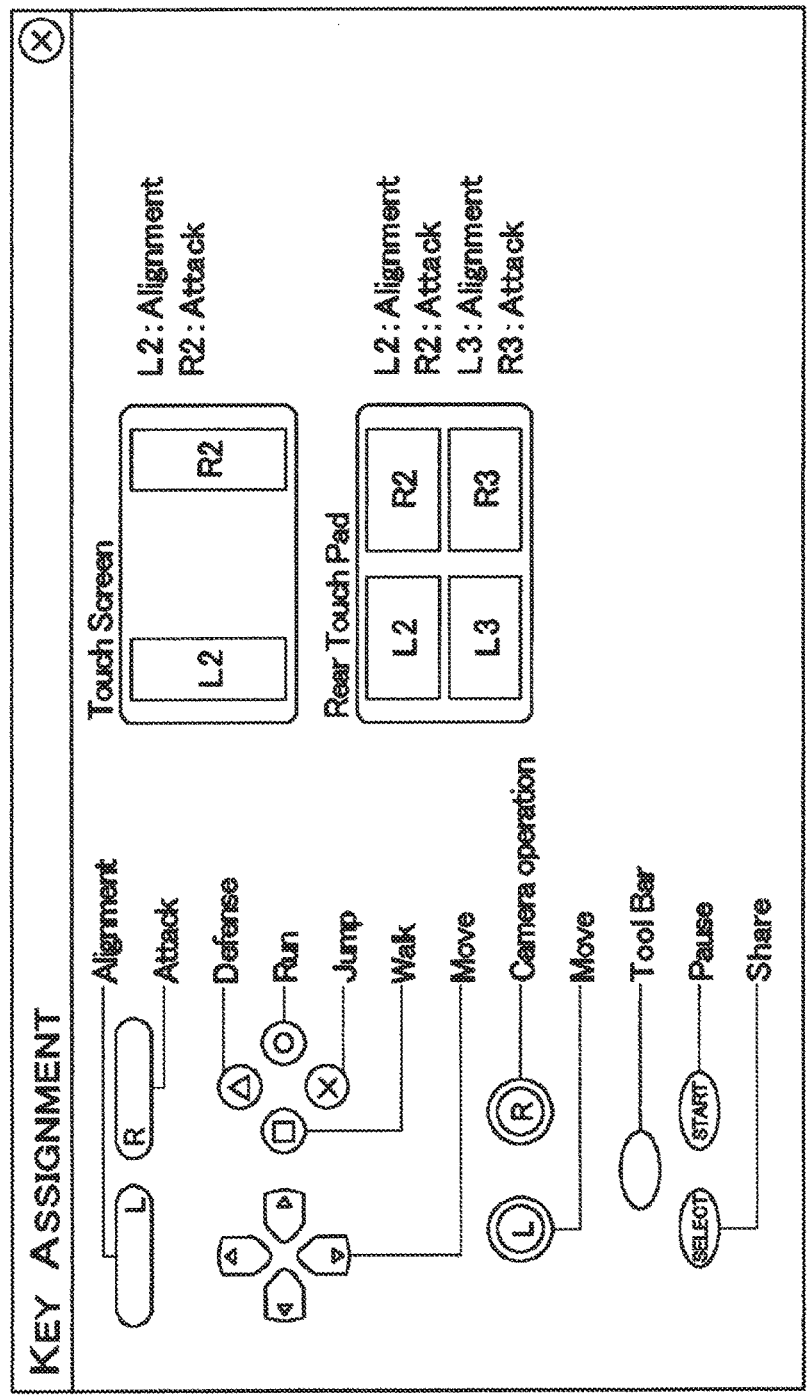
FIG. 11 is a diagram illustrating an example of input assignment information shown on the display device.

FIG. 11 illustrates an example of input assignment information shown on the display device 220. This input assignment information represents information for presenting, to the user, a correspondence between the input sections of the portable terminal device 200 and command information. The user can find out about the correspondence between the input sections of the portable terminal device 200 and command information by viewing this input assignment information. In the example illustrated in FIG. 11, the relationship between each input button and a command is shown on the left side, and the correspondence between the areas of the front and rear face touch pads 221 and 232 and the commands is shown on the right side. It should be noted that the schematic diagram of the front and rear face touch pads 221 and 232 on the right also shows the correspondence between the areas of each touch pad and the input sections of the game controller 6. Thus, if an input assignment diagram illustrates not only the relationship with command information but also that with the input sections of the game controller 6, it is possible for the user to comprehend at a glance how to operate the input sections of the portable terminal device 200. For example, if a message "Press the R2 key to attack" appears as guidance during a game, the user can find out, with ease, about the correspondence in the portable terminal device 200 by verifying the input assignment information.

Figure 12:
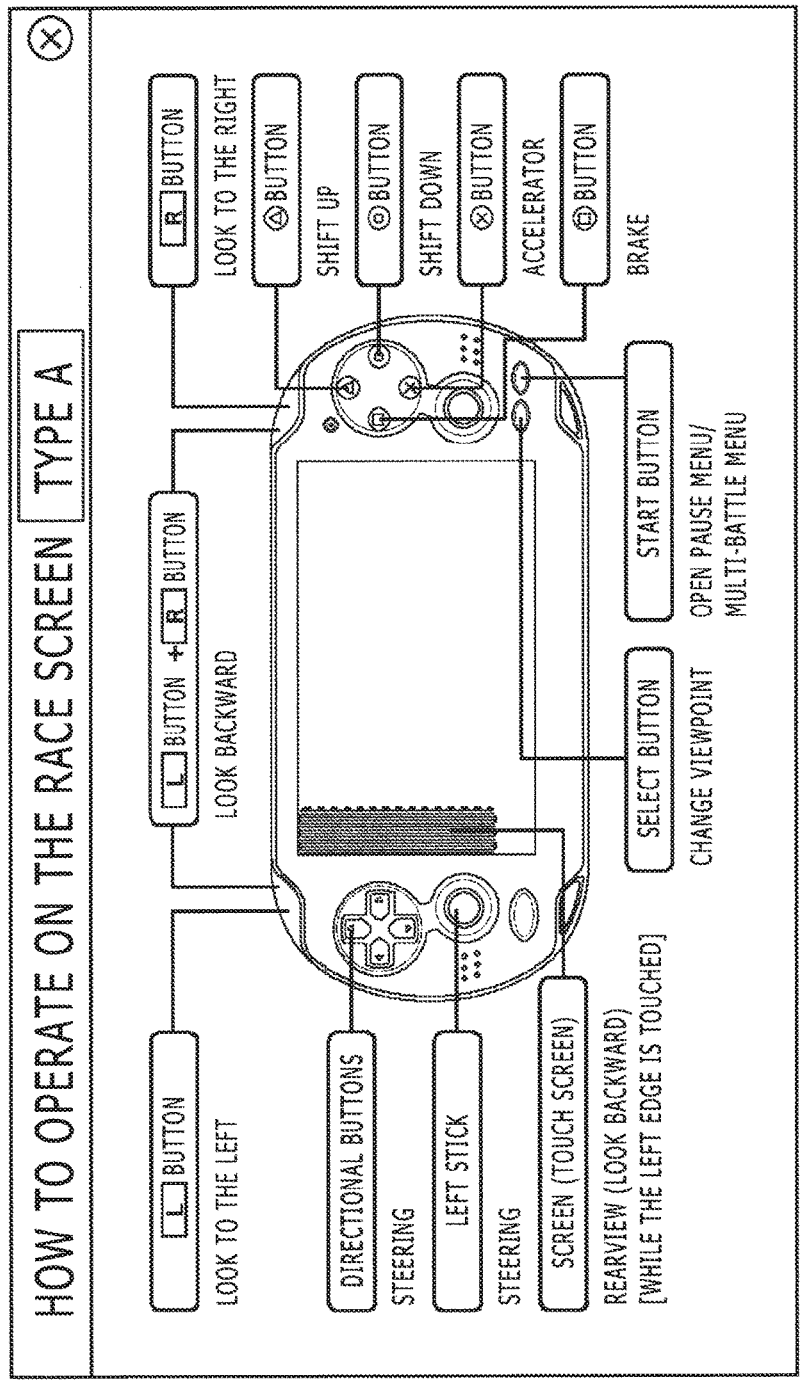
FIG. 12 is a diagram illustrating another example of input assignment information shown on the display device.

FIG. 12 illustrates another example of input assignment information shown on the display device 220. This input assignment information represents information for presenting, to the user, a correspondence between the input sections of the portable terminal device 200 and command information. The user can find out about the correspondence between the input sections of the portable terminal device 200 and command information by viewing this input assignment information. As compared to FIG. 11, FIG. 12 shows command information in association with each of the input sections schematically representing the front face portion of the portable terminal device 200, thus allowing the user to more intuitively recognize the correspondence between the input sections and command information.

It should be noted that a plurality of input assignments may be available with a game in Remote Play. For example, some users may not wish to use the rear face touch pad 232. In this case, an input assignment may be made available in which the button functions assigned to the areas of the rear face touch pad 232 in FIG. 11 are assigned to those of the front face touch pad 221. If a plurality of input assignments are available with a game, the user selects one of the input assignments before starting the game. Therefore, if a game has a plurality of types of input assignments, an input assignment correspondence and input assignment information are held in the storage section for each of the plurality of types.

When the input acceptance section 260 accepts an input assignment information acquisition request to the portable terminal device 200 while the user is playing a game in Remote Play, the wireless communication module 268 transmits the input assignment information acquisition request to the information processing device 10. This input assignment information acquisition request is transmitted to the information processing device 10 together with user-selected input assignment type information in addition to identification information of the application ID and the portable terminal device 200. In response to the input assignment information acquisition request from the portable terminal device 200, the mapping information provision section 124 uses the application ID and type information included in the request, reading input assignment information for the type information from the auxiliary storage device 2 as a storage section, or a given folder of the ROM media 44. The mapping information provision section 124 provides the input assignment information to the delivery processing section 130, and the delivery processing section 130 transmits the provided input assignment information to the portable terminal device 200 via the communication section 102.

In FIG. 12, "How to Operate on the Race Screen: Type A" appears at the top of the screen, indicating that, of a plurality of types of input assignments, the "type A" input assignment information is shown. Thus, information about a selected input assignment is shown on the display device 220, allowing the user to view, with ease, the currently used input assignment information. It should be noted that if the user selects the type B input assignment, information about that input assignment is shown. It should be noted that an input assignment may be set for each game scene, and moreover, a plurality of types of input assignments may be set for each game scene.

It should be noted that a description has been given of a case in which a game has input assignment information, and in which such information is held in a given folder of the storage section. In the meantime, a game may not, on its own, assign inputs, and may, instead, provide Remote Play by using a default input assignment, i.e., standard assignment. Even in such a case, the game may hold input assignment information associating the input sections of the portable terminal device 200 with game command information in a given folder. However, if a standard assignment is used, there is no need for the game to have input assignment information. In this case, the acceptance section 104 accepts an input assignment information acquisition request from the portable terminal device 200, and the mapping information provision section 124 determines, as a result of searching the storage section, that input assignment information is not included. If no input assignment information for the application is held in the storage section, the mapping information provision section 124 reads, from the storage section, input assignment information that indicates a correspondence between the input sections of the game controller 6 and those of the portable terminal device 200, and the delivery processing section 130 transmits the input assignment information to the portable terminal device 200. This input assignment information represents a standard assignment correspondence and may be the same as the input assignment information shown in FIG. 10.

A description will be given below of the handling of operation information transmitted from the portable terminal device 200 by the information processing device 10.

When the acceptance section 104 accepts operation information of the portable terminal device 200, the operation information is handed over to the assignment processing section 120. In the assignment processing section 120, the conversion processing section 122 acquires, in advance, an input assignment correspondence from the application executed by the application execution section 108 as input conversion information. Such an input assignment correspondence is acquired simultaneously with or immediately after the start of execution of the application. The input assignment correspondence may be an association between the input sections of the game controller 6 and those of the portable terminal device 200. Alternatively, the input assignment correspondence may be an association between the input sections of the portable terminal device 200 and game command information.

A description will be given below of the input assignment correspondence represented by the input assignment information shown in FIG. 11 as an example.

The conversion processing section 122 acquires, from an application, an input assignment correspondence as input conversion information. It should be noted that the following input assignment correspondence is acquired as input conversion information:

L button 226b Alignment
R button 226a Attack
Directional buttons 223 Move
Triangle button 222a Defence
Circle button 222b Run
Cross button 222c Jump
Square button 222d Walk
Left analog stick 224b Move
Right analog stick 224a Camera Operatin
Home button 227 Toolbar
SELECT button 229 Share
START button 228 Pause
Left area of the front face touch pad 221 Alignment
Right area of the front face touch pad 221 Attack
Top left area of the rear face touch pad 232 Alignment Top right area of the rear face touch pad 232 Attack
Bottom left area of the rear face touch pad 232 Alignment
Bottom right area of the rear face touch pad 232 Attack It should be noted that the areas of the front and rear face touch pads 221 and 232 are defined by coordinates on each of the touch pads. Further, the areas of the rear face touch pad 232 represent the positions that can be transparently seen from the front face.

The conversion processing section 122 acquires the above input assignment correspondence as input conversion information. The conversion processing section 122 converts, on the basis of this input conversion information, operation information of the portable terminal device 200 into operation information to be reflected in the processing of the application, providing the operation information to the application. Therefore, when the conversion processing section 122 receives, for example, operation information of the R button 226a of the portable terminal device 200, the conversion processing section 122 converts this operation information into operation information for the Attack command, providing the information to the application. As a result, the application can cause the game character to take an attacking action. The above is an example in which input conversion information is used to convert operation information of an input section of the portable terminal device 200 into game command information.

A description will be given next of a case in which input conversion information is information that converts operation information of the input sections of the portable terminal device 200 into those of the information processing device 10. At this time, the input assignment correspondence acquired by the conversion processing section 122 as input conversion information is as shown below. Here, the input sections of the portable terminal device 200 are listed on the left, and those of the information processing device 10 on the right.

L button 226b L1 button 83b
R button 226a R1 button 83a
Directional buttons 223 Directional buttons 71
Triangle button 222a Triangle button 75
Circle button 222b Circle button 72
Cross button 222c Cross button 73
Square button 222d Square button 74
Left analog stick 224b Left analog stick 77b
Right analog stick 224a Right analog stick 77a
START button 228 OPTIONS button 82
SELECT button 229 SHARE button 81
Left area of the front face touch pad 221 L2 button 84b
Right area of the front face touch pad 221 R2 button 84a
Top left area of the rear face touch pad 232 L2 button 84b
Top right area of the rear face touch pad 232 R2 button 84a
Bottom left area of the rear face touch pad 232 L3 button
Bottom right area of the rear face touch pad 232 R3 button It should be noted that the areas of the front and rear face touch pads 221 and 232 are defined by coordinates on each of the touch pads. Further, the areas of the rear face touch pad 232 represent the positions that can be transparently seen from the front face.

About the Home button 80, the function of the Home button 80 is assigned to the coordinates of the icon that appears in the toolbar that is shown when the Home button 227 is operated.

The conversion processing section 122 acquires the above input assignment correspondence as input conversion information. The conversion processing section 122 converts, on the basis of this input conversion information, operation information of the portable terminal device 200 into operation information to be reflected in the processing of the application, providing the operation information to the application. Therefore, when the conversion processing section 122 receives, for example, operation information of the R button 226a of the portable terminal device 200, the conversion processing section 122 converts this operation information into operation information of the R1 button 83a of the game controller 6, providing, to the application, two pieces of information, one indicating that the R1 button 83a has been operated and another indicating that this information was sent from the portable terminal device 200. In the application, operation information of the R1 button 83a is treated as an attacking action command. As a result, the application can cause the game character to take an attacking action. It should be noted that the game character may take a special action other than a normal attacking action when the application finds out that information indicating that the R1 button 83a was operated has been provided from the portable terminal device 200. The above is an example in which input conversion information is used to convert operation information of an input section of the portable terminal device 200 into operation information of an input section of the game controller 6.

Thus, input conversion information is correspondence information used to convert operation information of the input sections of the portable terminal device 200 into operation information to be reflected in the processing of an application. The conversion processing section 122 may acquire input conversion information in a table form. In any case, all that is required is to be able to convert, using input conversion information, operation information of the input sections of the portable terminal device 200 into operation information for proper processing by the application.

It should be noted that, as described above, a plurality of types of input assignments may be available with an application. In this case, the user selects an input assignment type to use and then operates the portable terminal device 200 in accordance with the selected type of input assignment. The input acceptance section 260 accepts operation information the type of whose input assignment was selected by the user, and the wireless communication module 268 transmits selected assignment type information to the information processing device 10 at the time when the input acceptance section 260 receives the operation information. The conversion processing section 122 converts operation information of the portable terminal device 200 into operation information to be reflected in the processing of the application using this assignment type information. More specifically, the conversion processing section 122 acquires input conversion information for the selected assignment type information from the application, converting operation information on the basis of this input conversion information. That is, when the user selects the type A input assignment, assignment type information identifying type A is notified to the conversion processing section 122. As a result, the conversion processing section 122 acquires type A input assignment information from the application. On the other hand, when the user selects the type B input assignment, assignment type information identifying type B is notified to the conversion processing section 122. As a result, the conversion processing section 122 acquires type B input assignment information from the application. This allows the conversion processing section 122 to provide, to the application, appropriate operation information that matches the input assignment selected by the user.

It should be noted that the portable terminal device 200 has input sections that are not available with the game controller 6 as described above. The rear face touch pad 232 is typically such an input section. Depending on the game, operation information of the rear face touch pad 232 in Remote Play may be used as command information different from that of the game controller 6. Therefore, the conversion processing section 122 may provide coordinate-related information included in the operation information of the rear face touch pad 232 in addition to converting operation information of the rear face touch pad 232 of the portable terminal device 200 into operation information to be reflected in the processing of the application and providing the operation information to the application. In the correspondence shown in FIG. 11, for example, the alignment action command is activated by the L1, L2, and L3 buttons of the game controller 6, and corresponds to the L button 226b of the portable terminal device 200, the left area of the front face touch pad 221, and the left area of the rear face touch pad 232 (left area as seen from the front face). The portable terminal device 200 transmits operation information of each touch pad as coordinates thereof. The conversion processing section 122 determines, on the basis of the coordinates, that the operation information is the alignment action command, informing the application to that effect. If the user moves his or her fingers on the rear face touch pad 232 at this time, the conversion processing section 122 acquires coordinates that are continuous in time. This is operation information that could not be entered with the L3 button of the game controller 6. In Remote Play, the game may give variations to the alignment action by using coordinates that are continuous in time. If the game can process such operation information, it is possible to make a change, unique to the input operation of the portable terminal device 200, to the game's progress, thus providing enhanced value to Remote Play.

Thus, the present invention has been described on the basis of an embodiment. It is to be understood by those skilled in the art that the present embodiment is illustrative, that the combination of components and processes can be modified in various ways, and that such modification examples also fall within the scope of the present invention.

It has been described in the embodiment that a game can, on its own, assign the input sections of the game controller 6 to those of the portable terminal device 200. However, a plurality of types of standard input assignments may be set up in the information processing system 1 so that the application selects one of these input assignments. Different types of input assignments will be illustrated below. In each of the input assignments, the directional buttons 71, the action buttons 76, the R1 and L1 buttons 83a and 83b, and the right and left analog sticks 77a and 77b of the game controller 6 correspond to the directional buttons 223, the action buttons 222, the R and L buttons 226a and 226b, and the right and left analog sticks 224a and 224b of the portable terminal device 200, respectively. Further, the SHARE and OPTIONS buttons 81 and 82 correspond to the SELECT and START buttons 229 and 228, respectively. In each type, therefore, the assignment of the R2 and L2 buttons 84a and 84b, the R3 button, the push-down button of the right analog stick 77a, the L3 button, the push-down button of the left analog stick 77b, and the touch pad 79 of the game controller 6 is set up.

The terms "left" and "right" of the rear face touch pad 232 represent those as seen from the rear face.

Figure 13:
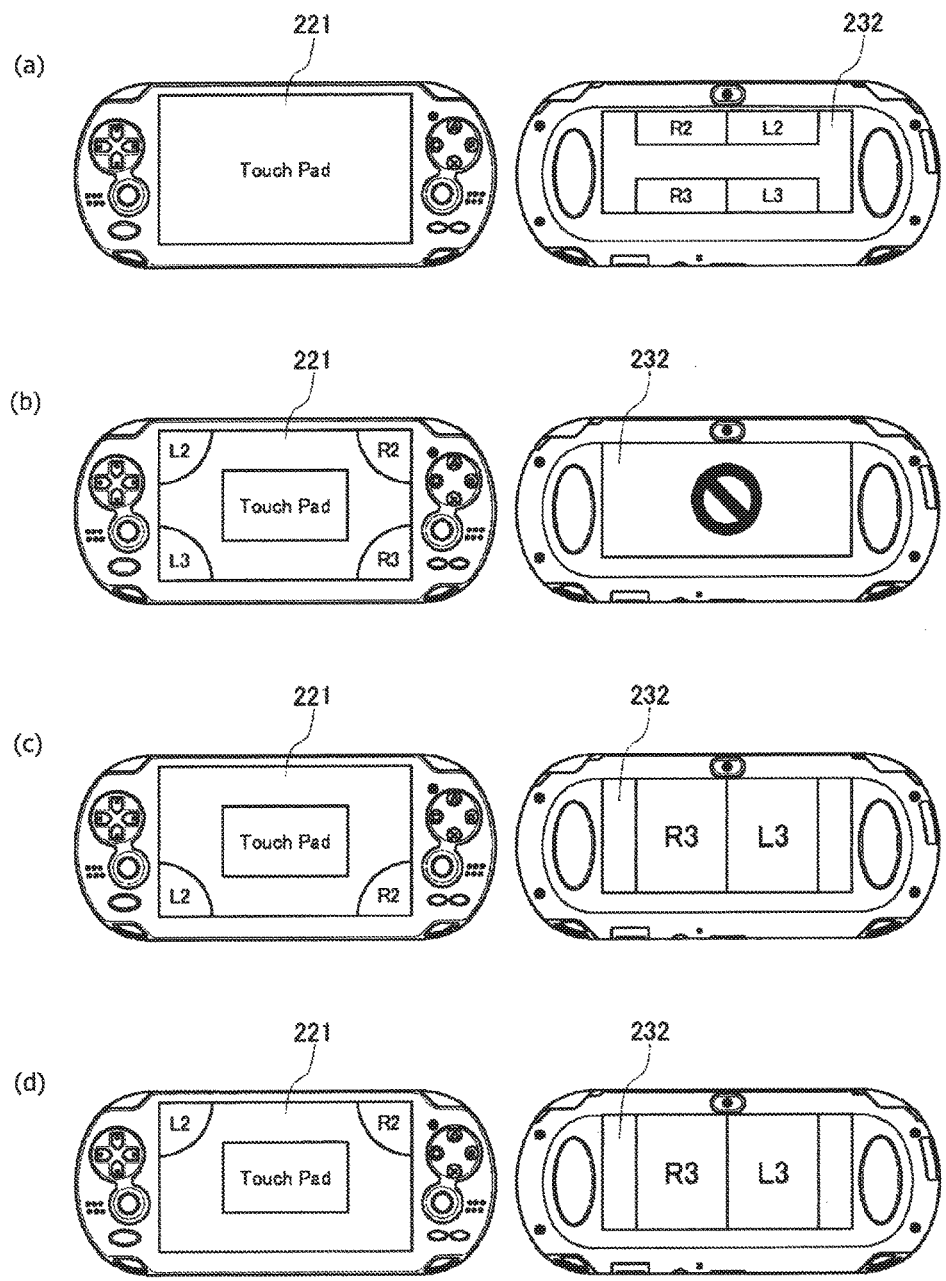
FIG. 13 (a) to (d) are diagrams illustrating standard assignment types 1 to 4, respectively.

FIG. 13(a) illustrates the type 1 standard assignment. In type 1, the function of the touch pad 79 of the game controller 6 is assigned to the entire surface of the front face touch pad 221 of the portable terminal device 200. The functions of the R2, L2, R3, and L3 buttons of the game controller 6 are assigned to the rear face touch pad 232 of the portable terminal device 200. Here, the function of the R2 button is assigned to the top left area of the rear face touch pad 232, that of the L2 button to the top right area thereof, that of the R3 button to the bottom left area thereof, and that of the L3 button to the bottom right area thereof. This type 1 is the same as the type described with reference to FIG. 9.

FIG. 13(b) illustrates a type 2 standard assignment. In type 2, the function of the touch pad 79 of the game controller 6 is assigned to the center area of the front face touch pad 221 of the portable terminal device 200. The functions of the R2, L2, R3, and L3 buttons of the game controller 6 are assigned to the top right, top left, bottom right, and bottom left corner areas of the front face touch pad 221, respectively. Here, each corner area includes a corner of the rectangular front face touch pad 221 and may be fan-shaped as illustrated. In type 2, the rear face touch pad 232 is not used, with the functions of the buttons and the touch pad 79 assigned only to the front face touch pad 221.

FIG. 13(c) illustrates a type 3 standard assignment. In type 3, the functions of the touch pad 79 and the R2 and L2 buttons of the game controller 6 are assigned to the center area and the bottom right and left corner areas of the front face touch pad 221 of the portable terminal device 200, respectively. Further, the functions of the R3 and L3 buttons of the game controller 6 are assigned to the left and right side areas of the rear face touch pad 232, respectively. As with type 2, each corner area includes a corner of the rectangular front face touch pad 221.

FIG. 13(d) illustrates a type 4 standard assignment. In type 4, the functions of the touch pad 79 and the R2 and L2 buttons of the game controller 6 are assigned to the center area and the top right and left corner areas of the front face touch pad 221 of the portable terminal device 200, respectively. Further, the functions of the R3 and L3 buttons of the game controller 6 are assigned to the left and right side areas of the rear face touch pad 232, respectively. As with types 2 and 3, each corner area includes a corner of the rectangular front face touch pad 221.

As described above, the type 1 to 4 standard input assignments may be available with the information processing system 1. Input assignment information is held in each of the information processing device 10 and the portable terminal device 200.

In the modification example, the portable terminal device 200 may have the function of the conversion processing section 122 shown in FIG. 6. If one of the four input assignments is selected by the application, the application execution section 108 notifies the selected type information to the portable terminal device 200. In the portable terminal device 200, the storage section 270 holds input conversion information for each type. When the type information used by the application is notified, the conversion processing function of the portable terminal device 200 reads the input conversion information for that type information from the storage section 270, converting button operation information of the portable terminal device 200 into button operation information of the game controller 6 and transmitting the operation information to the information processing device 10 together with information indicating that the operation information is that of the portable terminal device 200. Thus, if a standard type of input assignment made available in advance is used by the game, storing input conversion information therefor in the portable terminal device 200 allows for transmission of converted operation information to the information processing device 10. It should be noted that, even in this case, game's input assignment information is held in the information processing device 10, and that the portable terminal device 200 can show input assignment information illustrated in FIG. 11 or 12 on the display device 220 by receiving such information from the mapping information provision section 124.

It should be noted that if the application has no input assignment information, the mapping information provision section 124 may notify the portable terminal device 200 to that effect. In this case, because the portable terminal device 200 has standard input assignment information held in the storage section 270, the image data generation section 272 can show, on the display device 220, the type of input assignment information used by the application.

It should be noted that if the button functions are assigned to the front face touch pad 221 as in types 2 to 4, pressing one of the areas with assigned button functions may cause that area to appear as if it pops out. Further, if the button functions are assigned to the rear face touch pad 232 as in types 1, 3, and 4, pressing one of the areas with assigned to the rear face touch pad 232 may cause an indicator of the rear face touch pad 232 to appear on the display device 220. This allows the user to confirm that he or she has successfully pressed the software button assigned to the touch pad.

FIG. 14 illustrates an example of a game screen. A rear face touch pad indicator 350 appears at the top left corner of the game screen. The rear face touch pad indicator 350 appears when the user touches one of the areas with assigned button functions of the rear face touch pad 232, and does not if the user does not touch any of the areas. In this example, the area with the assigned button function associated with the touched location is lit, allowing the user to confirm that he or she has operated the button as intended.

It should be noted that it has been described in the present embodiment that pressing the Home button 227 during Remote Play causes the item display section 266 to show two icons, the terminal device icon 334a and the Home icon 334b, in a single toolbar. The terminal device icon 334a is designed to show a screen for the portable terminal device 200. The Home icon 334b is designed to show a screen for the information processing device 10. In the embodiment, when the terminal device icon 334a is selected, the image data generation section 272 generates image data for the portable terminal device 200. On the other hand, when the Home icon 334b is selected, the processing section 100 of the information processing device 10 generates image data for the information processing device 10, and image data is acquired by the image data acquisition section 262. Thus, the technology for showing, when a single button is pressed (e.g., Home button 227), two input sections in a common display area (toolbar), one for performing a function originally assigned to that button and another for performing a function in another information processing device is applicable to other fields. Making available, in a single display area, input sections for performing processing in a plurality of information processing devices allows the user to perform processing in one of the information processing devices simply by showing a toolbar, thus providing a highly easy-to-use user interface.

REFERENCE SIGNS LIST

1 . . . Information processing system, 2 . . . Auxiliary storage device, 4 . . . Output device, 6 . . . Game controller, 10 . . . Information processing device, 100 . . . Processing section, 102 . . . Communication section, 104 . . . Acceptance section, 106 . . . Menu image generation section, 108 . . . Application execution section, 110 . . . Application image generation section, 120 . . . Assignment processing section, 122 . . . Conversion processing section, 124 . . . Mapping information provision section, 130 . . . Delivery processing section, 200 . . . Portable terminal device, 220 . . . Display device, 260 . . . Input acceptance section, 262 . . . Image data acquisition section, 264 . . . Reproduction section, 266 . . . Item display section, 268 . . . Wireless communication module, 270 . . . Storage section

INDUSTRIAL APPLICABILITY

The present invention is applicable to technical fields for operating an information processing device using a terminal device.

The invention claimed is:

1. An information processing device capable of accepting operation information from a controller, the information processing device comprising:
   an acceptance section adapted to accept operation information from a terminal device different from the controller, the terminal device having at least one input section, for sending operation information, that is not available on the controller;
   an execution section adapted to execute an application in accordance with operation information accepted by the acceptance section, the application being configured to, in a manner not possible using operation information from the controller, affect progress of the application according to operation information obtained from the at least one input section;
   a delivery processing section adapted to transmit application image data to the terminal device; and
   a storage section adapted to hold input assignment information of the terminal device, wherein
   the delivery processing section transmits, to the terminal device, input assignment information of the application under execution held by the storage section.

2. The information processing device of claim 1, wherein the delivery processing section transmits, to the terminal device, input assignment information between the controller and the terminal device if input assignment information of the application under execution is not held by the storage section.

3. The information processing device of claim 1, further comprising: a conversion processing section adapted to acquire input conversion information from the application executed by the execution section, convert operation information of the terminal device into operation information to be reflected in the processing of the application on the basis of the input conversion information, and provide the operation information to the application.

4. The information processing device of claim 3, wherein the conversion processing section acquires assignment type information from the terminal device and converts operation information of the terminal device into operation information to be reflected in the processing of the application using the assignment type information.

5. The information processing device of claim 3, wherein the conversion processing section provides coordinate-related information included in the operation information of the touch pad to the application in addition to operation information of a touch pad of the terminal device into operation information to be reflected in the processing of the application and providing the operation information to the application.

6. An information processing system comprising:
- an information processing device capable of accepting operation information from a controller; and
- a terminal device different from the controller, the terminal device including:
  - a transmission section adapted to transmit operation information;
  - a reception section adapted to receive application image data; and
  - a reproduction section adapted to reproduce received application image data and show the data on a display device; and
- the information processing device including:
  - an acceptance section adapted to accept operation information from the terminal device;
  - an execution section adapted to execute an application in accordance with operation information accepted by the acceptance section;
  - a delivery processing section adapted to transmit application image data to the terminal device; and
  - a storage section adapted to hold input assignment information of the terminal device, wherein
- the delivery processing section transmits, to the terminal device, input assignment information of the application under execution held by the storage section,
- the terminal device has at least one input section, for sending operation information, that is not available on the controller, and
- the application is configured to, in a manner not possible using operation information from the controller, affect progress of the application according to operation information obtained from the at least one input section.

7. An information processing device capable of accepting operation information from a controller, the information processing device comprising:
- an input acceptance section adapted to accept given operation information from a terminal device different from the controller;
- a display section adapted to show first and second input sections when given operation information is accepted by the input acceptance section, the first input section showing a screen for the information processing device, and the second input section showing a screen for an information processing device different from the information processing device;
- an image data generation section adapted to generate an image for the information processing device when the first input section is selected;
- an image data acquisition section adapted to acquire image data generated by the information processing device different from the information processing device when the second input section is selected; and
- an execution section adapted to execute an application in accordance with operation information accepted by the acceptance section; wherein
- the terminal device has at least one input section, for sending operation information, that is not available on the controller, and
- the application is configured to, in a manner not possible using operation information from the controller, affect progress of the application according to operation information obtained from the at least one input section.

* * * * *